US010187831B2

(12) United States Patent
Tsuda et al.

(10) Patent No.: US 10,187,831 B2
(45) Date of Patent: Jan. 22, 2019

(54) COMMUNICATION CONTROL APPARATUS, COMMUNICATION CONTROL METHOD, RADIO COMMUNICATION SYSTEM AND TERMINAL APPARATUS

(71) Applicant: SONY CORPORATION, Tokyo (JP)

(72) Inventors: Shinichiro Tsuda, Kanagawa (JP); Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/907,134

(22) PCT Filed: Jun. 24, 2014

(86) PCT No.: PCT/JP2014/066746
§ 371 (c)(1),
(2) Date: Jan. 22, 2016

(87) PCT Pub. No.: WO2015/022814
PCT Pub. Date: Feb. 19, 2015

(65) Prior Publication Data
US 2016/0192255 A1 Jun. 30, 2016

(30) Foreign Application Priority Data

Aug. 12, 2013 (JP) ................................. 2013-167755
Apr. 2, 2014 (JP) ................................. 2014-075987

(51) Int. Cl.
*H04W 16/08* (2009.01)
*H04W 36/04* (2009.01)
(Continued)

(52) U.S. Cl.
CPC ........... *H04W 36/04* (2013.01); *H04W 16/08* (2013.01); *H04W 36/165* (2013.01);
(Continued)

(58) Field of Classification Search
CPC ............... H04W 36/04; H04W 52/343; H04W 52/0206; H04W 36/165; H04W 16/08; H04W 52/362; H04W 16/32
See application file for complete search history.

(56) References Cited

U.S. PATENT DOCUMENTS

2007/0026864 A1* 2/2007 Singh .................... H04W 36/06
455/438
2011/0194429 A1* 8/2011 McWilliams ..... H04W 52/0206
370/252
(Continued)

FOREIGN PATENT DOCUMENTS

CN 102197696 A 9/2011
JP 2011-091748 A 5/2011
(Continued)

OTHER PUBLICATIONS

Extended European Search Report of EP Patent Application No. 14836205.6, dated Feb. 21, 2017, 9 pages.
(Continued)

*Primary Examiner* — Lakeram Jangbahadur
(74) *Attorney, Agent, or Firm* — Chip Law Group

(57) ABSTRACT

A communication control apparatus includes, a radio communication unit configured to provide a second radio communication service within a cell in which a first base station provides a first radio communication service; and a control unit configured to, when an operation mode of the radio communication unit is made to transition from a first mode to a second mode in which power is less consumed than in the first mode, switch the operation mode to the second mode after stepwisely reducing transmission power of a reference signal to be transmitted from the radio communication unit.

18 Claims, 27 Drawing Sheets

(51) Int. Cl.
*H04W 36/16* (2009.01)
*H04W 52/02* (2009.01)
*H04W 52/34* (2009.01)
*H04W 16/32* (2009.01)
*H04W 52/36* (2009.01)

(52) U.S. Cl.
CPC ..... *H04W 52/0206* (2013.01); *H04W 52/343* (2013.01); *H04W 16/32* (2013.01); *H04W 52/362* (2013.01); *Y02D 70/00* (2018.01); *Y02D 70/1262* (2018.01); *Y02D 70/1264* (2018.01); *Y02D 70/164* (2018.01); *Y02D 70/166* (2018.01); *Y02D 70/21* (2018.01)

(56) References Cited

U.S. PATENT DOCUMENTS

| | | | | |
|---|---|---|---|---|
| 2011/0244866 | A1* | 10/2011 | Yamamoto | H04W 36/22 455/438 |
| 2011/0269511 | A1* | 11/2011 | Karlsson | H04L 27/0008 455/572 |
| 2012/0004009 | A1* | 1/2012 | Lindoff | H04W 52/0232 455/522 |
| 2012/0190352 | A1* | 7/2012 | Huang | H04W 24/02 455/418 |
| 2012/0270553 | A1* | 10/2012 | Ha | H04W 36/22 455/438 |
| 2013/0194989 | A1 | 8/2013 | Centonza et al. | |
| 2013/0294272 | A1* | 11/2013 | Xiao | H04W 52/0206 370/252 |
| 2013/0294415 | A1* | 11/2013 | Moilanen | H04W 72/0486 370/331 |
| 2014/0211763 | A1* | 7/2014 | Choi | H04W 36/20 370/332 |
| 2014/0355570 | A1* | 12/2014 | Smith | H04W 36/0072 370/332 |
| 2015/0215879 | A1* | 7/2015 | Zhu | H04W 56/001 370/350 |
| 2015/0245270 | A1* | 8/2015 | Wu | H04W 36/22 370/331 |
| 2016/0135123 | A1* | 5/2016 | Soldati | H04W 52/0206 370/311 |
| 2017/0006659 | A1* | 1/2017 | Jha | H04W 36/22 |

FOREIGN PATENT DOCUMENTS

| | | |
|---|---|---|
| JP | 2011-523272 A | 8/2011 |
| WO | 2010-050321 A | 5/2010 |
| WO | 2010/050321 A1 | 5/2010 |
| WO | 2011/029497 A1 | 3/2011 |
| WO | 2012-000551 A | 1/2012 |
| WO | 2012/000551 A1 | 1/2012 |
| WO | 2012/146683 A1 | 11/2012 |

OTHER PUBLICATIONS

Office Action for JP Patent Application No. 2015-531742, dated May 8, 2018, 05 pages of Office Action and 05 pages of English Translation.

Office Action for EP Patent Application No. 14836205.6, dated Jun. 19, 2018, 5 pages.

Office Action for CN Patent Application No. 201480044487.1, dated Sep. 3, 2018, 16 pages of Office Action and 51 pages of English Translation.

* cited by examiner

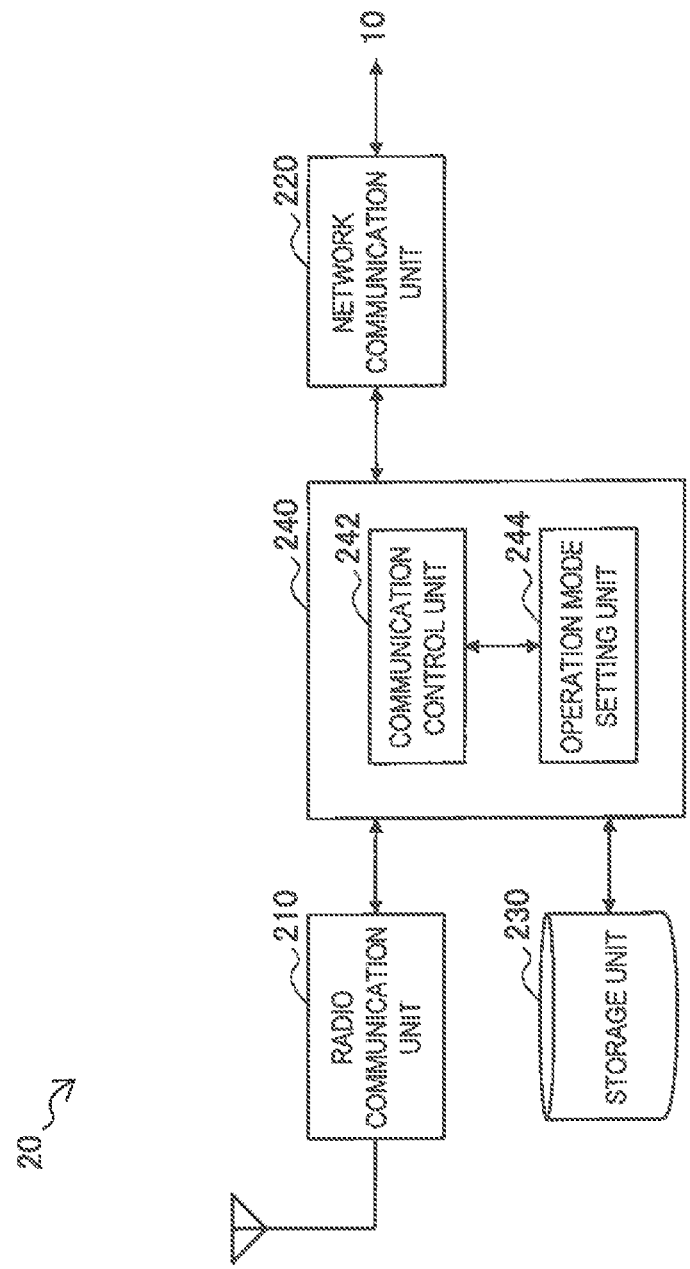

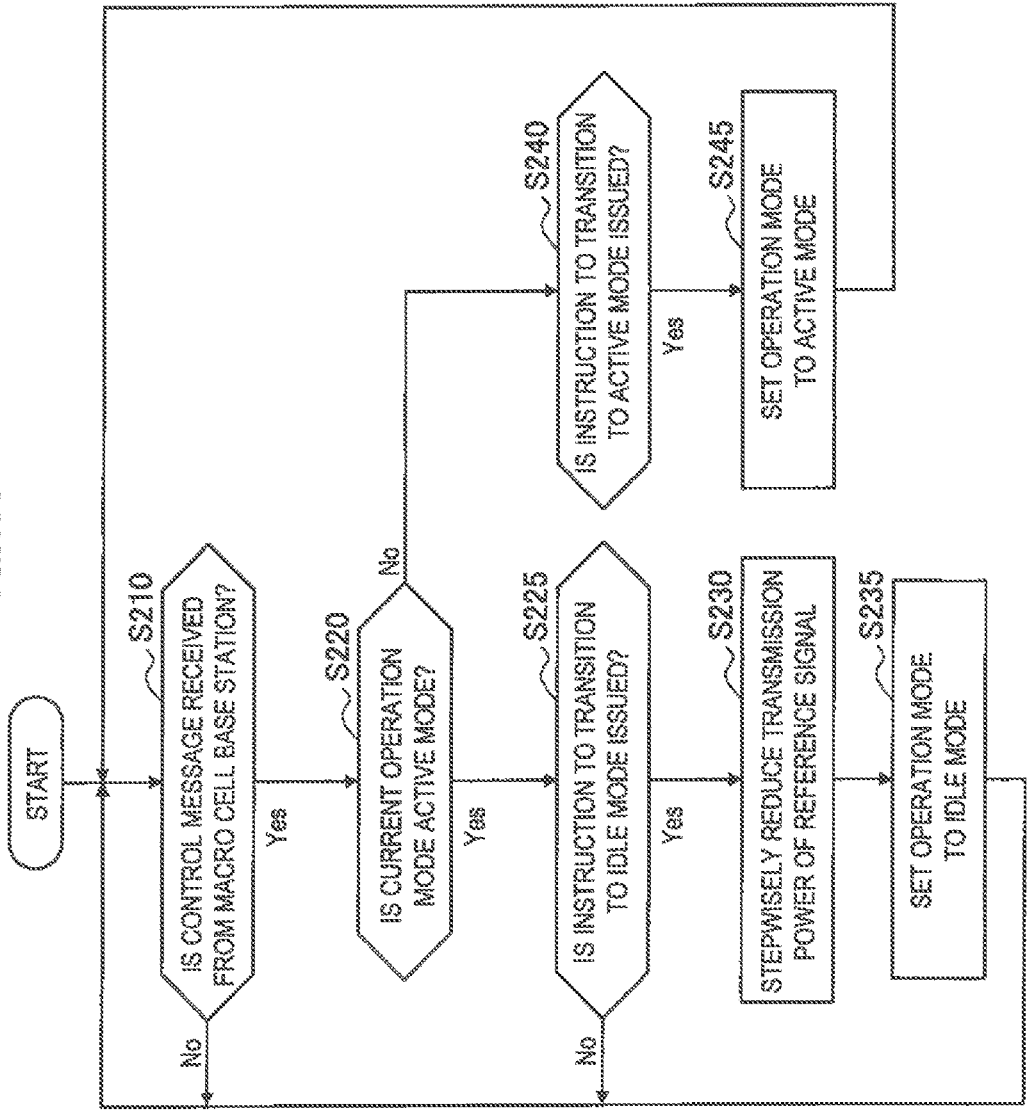

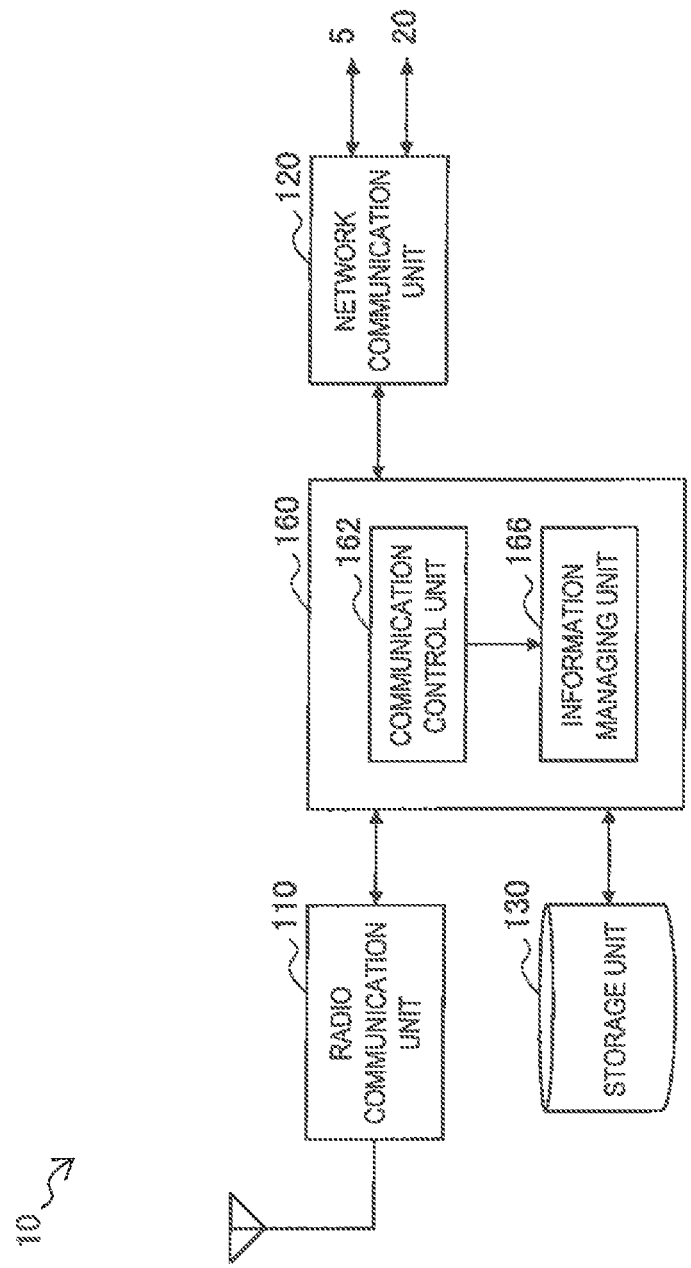

COMMUNICATION CONTROL APPARATUS, COMMUNICATION CONTROL METHOD, RADIO COMMUNICATION SYSTEM AND TERMINAL APPARATUS

TECHNICAL FIELD

The present disclosure relates to a communication control apparatus, a communication control method, a radio communication system and a terminal apparatus.

BACKGROUND ART

A traffic amount handled in cellular communication service such as third generation mobile phone service has rapidly increased under encouragement of introduction of a high speed packet communication protocol such as high speed packet access (HSPA), or the like. A user now can download large data such as music data and video streaming data from a network via cellular communication service. Long term evolution (LTE) which has been put into practical use in recent years is high speed cellular communication service also referred to as 3.9 generation mobile phone service. In the LTE, for example, by using orthogonal frequency division multiple access (OFDMA) in downlink, a peak data rate of 100 Mbps or higher can be realized. In the fourth generation mobile phone service which is to be put into practical use in around 2015, it is expected that a data rate of 1 Gbps at a maximum can be realized in a semi-fixed environment, and 100 Mbps at a maximum can be realized in a mobile environment.

However, such development of cellular communication service does not catch up with increase of data traffic, and there still remains a risk of local degradation of a data rate and occurrence of a network failure due to increase of system load. One measure against such a risk is introduction of a small cell. The small cell which is, for example, disposed so as to cover a hot spot where traffic is concentrated, can be used to complement radio communication service of a macro cell or provide specific service. A network formed by disposing a plurality of different types of cells such as macro cells and small cells in an overlapped manner is also referred to as a heterogeneous network. Patent Literature 1 discloses a technique of resting a small cell base station when there is no terminal in the vicinity and activating a resting small cell when there is a terminal in the vicinity for the purpose of saving power in the heterogeneous network.

CITATION LIST

Patent Literature

Patent Literature 1: JP 2011-91748A

SUMMARY OF INVENTION

Technical Problem

However, with a method in which an operation mode of a small cell base station is passively controlled depending on presence of a terminal in the vicinity, it is difficult to say that sufficient power saving is achieved. For example, in a situation where load of a macro cell is not very high, if a small cell base station is made to operate in an active mode while a very few terminal exists in the vicinity, it is not efficient in terms of power consumption of the whole system.

Therefore, it is desirable to realize a mechanism which enables further power saving in a heterogeneous network.

Solution to Problem

According to the present disclosure, there is provided a communication control apparatus including: a radio communication unit configured to provide second radio communication service within a cell in which a first base station provides first radio communication service; and a control unit configured to, when an operation mode of the radio communication unit is made to transition from a first mode to a second mode in which power is less consumed than in the first mode, switch the operation mode to the second mode after stepwisely reducing transmission power of a reference signal to be transmitted from the radio communication unit.

According to the present disclosure, there is provided a communication control method including: providing second radio communication service by a second base station within a cell in which a first base station provides first radio communication service; and switching, when an operation mode of the second base station is made to transition from a first mode to a second mode in which power is less consumed than in the first mode, the operation mode to the second mode after stepwisely reducing transmission power of a reference signal to be transmitted from the second base station.

According to the present disclosure, there is provided a radio communication system including: a first base station configured to provide first radio communication service; and a second base station including a radio communication unit configured to provide second radio communication service within a cell of the first radio communication service, and a control unit configured to, when an operation mode of the radio communication unit is made to transition from a first mode to a second mode in which power is less consumed than in the first mode, switch the operation mode to the second mode after stepwisely reducing transmission power of a reference signal to be transmitted from the radio communication unit.

According to the present disclosure, there is provided a terminal apparatus including: a radio communication unit configured to utilize second radio communication service provided by a second base station within a cell in which a first base station provides first radio communication service; and a control unit configured to switch a connection destination of the radio communication unit from the second base station to another base station while transmission power of a reference signal received by the radio communication unit is reduced stepwisely in the process in which an operation mode of the second base station transitions from a first mode to a second mode in which power is less consumed than in the first mode.

According to the present disclosure, there is provided a communication control apparatus including: a radio communication unit configured to provide first radio communication service within a cell; and a control unit configured to, when an operation mode of a second base station which provides second radio communication service within the cell is made to transition from a first mode to a second mode in which power is less consumed than in the first mode, made the second base station switch the operation mode to the second mode after stepwisely reducing transmission power of a reference signal to be transmitted from the second base station.

Advantageous Effects of Invention

According to the present disclosure, it is possible to realize further power saving in a heterogeneous network.

It should be noted that the above-described advantageous effect is not necessarily limited, and any advantageous effect described in the present specification or other advantageous effects which can be understood from the present specification may be provided in addition to the above-described advantageous effect or in place of the above-described advantageous effect.

BRIEF DESCRIPTION OF DRAWINGS

FIG. 5 is a block diagram illustrating an example of a configuration of a small cell base station according to the first embodiment.

FIG. 7A is a flowchart illustrating an example of flow in first scenario of communication control processing executed by the small cell base station according to the first embodiment.

FIG. 9 is a block diagram illustrating an example of a configuration of a macro cell base station according to a second embodiment.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Further, explanation will be provided in the following order.

1. Outline of system
2. First embodiment
  2-1. Configuration example of macro cell base station
  2-2. Configuration example of small cell base station
  2-3. Configuration example of terminal apparatus
  2-4. Processing flow (macro cell base station)
  2-5. Processing flow (small cell base station)
3. Second embodiment
  3-1. Configuration example of macro cell base station
  3-2. Configuration example of small cell base station
  3-3. Configuration example of terminal apparatus
  3-4. Processing flow (macro cell base station)
  3-5. Processing flow (small cell base station)
4. Application example
5. Conclusion

1. Outline of System

Figure 1A:
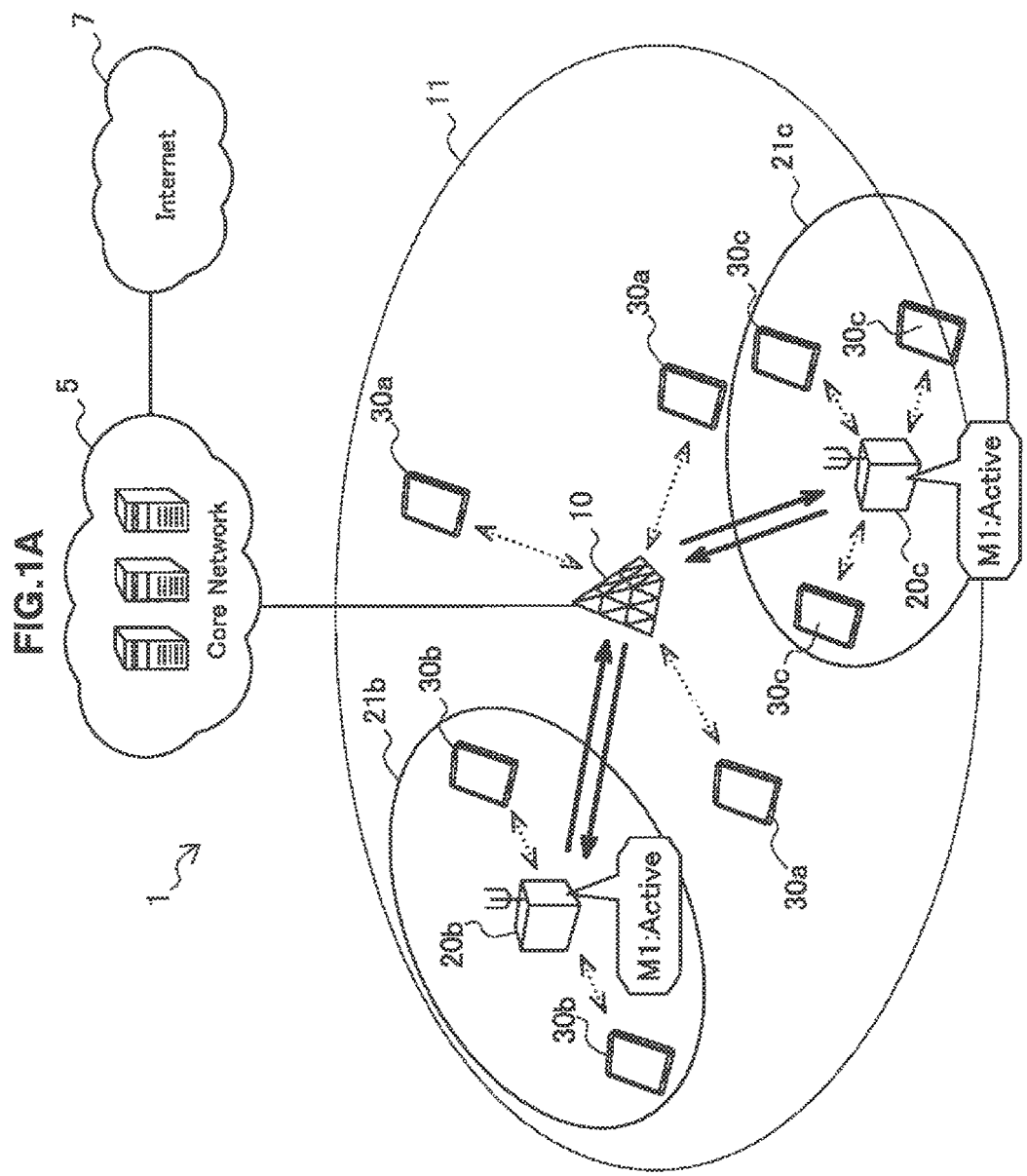
FIG. 1A is a first explanatory diagram for explaining outline of a radio communication system to which a technique according to the present disclosure is applied.
Figure 1B:
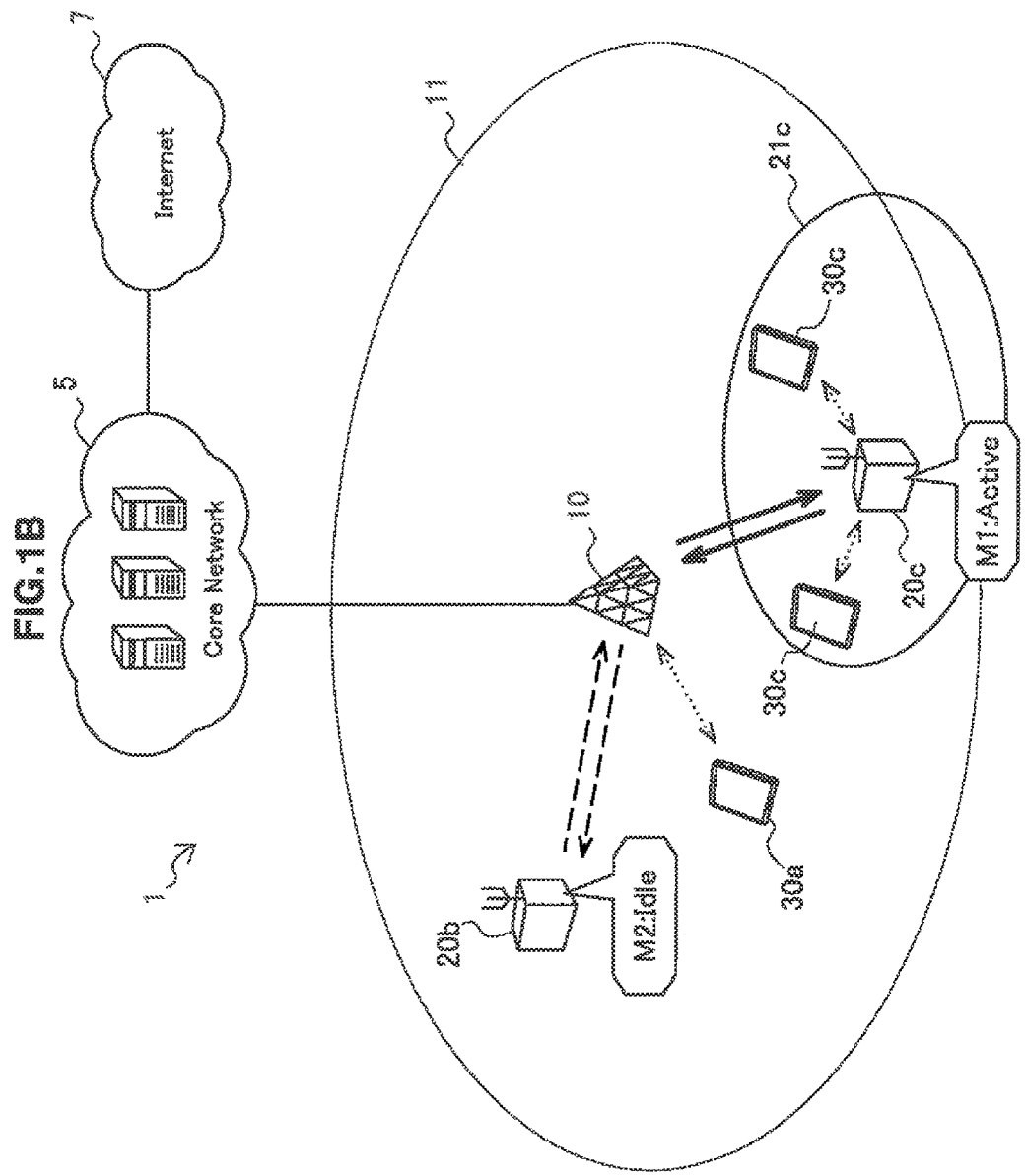
FIG. 1B is a second explanatory diagram for explaining outline of a radio communication system to which a technique according to the present disclosure is applied.
Figure 1C:
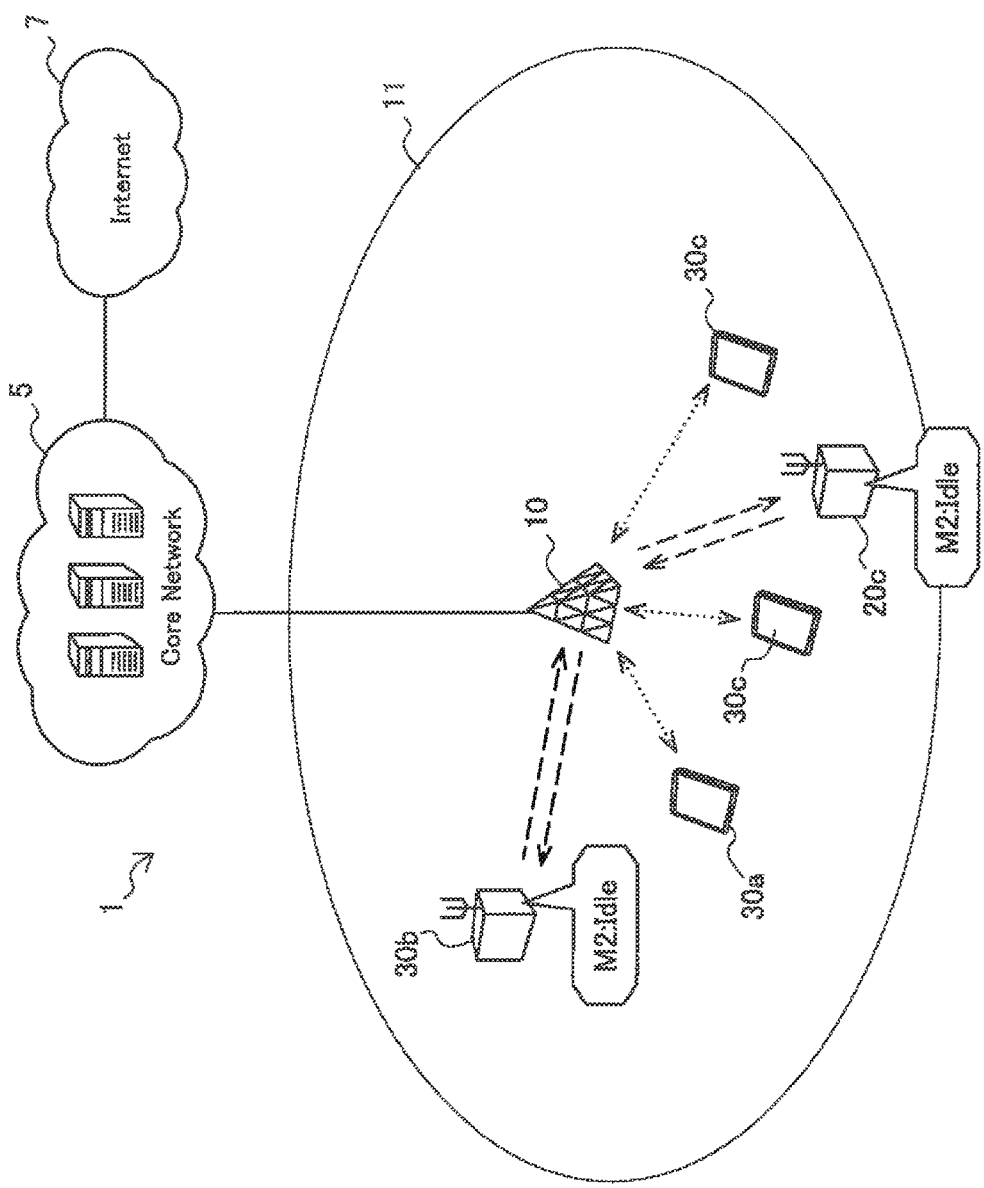
FIG. 1C is a third explanatory diagram for explaining outline of a radio communication system to which a technique according to the present disclosure is applied.

FIG. 1A to FIG. 1C are explanatory diagrams for explaining outline of a radio communication system 1 to which a technique according to the present disclosure is applied. Referring to FIG. 1A, the radio communication system 1 includes a macro cell base station 10, small cell base stations 20b and 20c, and terminal apparatuses 30a, 30b and 30c. It should be noted that the number of macro cell base stations, the number of small cell base stations and the number of terminal apparatuses included in the radio communication system 1 are not limited to the example of FIG. 1A. For example, the radio communication system 1 may include two or more macro cell base stations.

The macro cell base station 10 is a base station which provides first radio communication service within a macro cell 11. The macro cell base station 10 can operate the macro cell 11 by utilizing, for example, a frequency channel legally permitted or authorized. The macro cell base station 10 may operate the macro cell 11 using a frequency division duplex (FDD) or may operate the macro cell 11 using a time division duplex (TDD). The terminal apparatuses located within the macro cell 11 can be connected to the macro cell base station 10. In the example of FIG. 1A, three terminal apparatuses 30a are connected to the macro cell base station 10.

The small cell base stations 20b and 20c are base stations which respectively provide second radio communication service within the macro cell 11. In the present specification, the small cell is concept including a femto cell, a nano cell, a pico cell, a micro cell, or the like. The second radio communication service may be radio communication service which, for example, increases capacity of the first radio communication service at a hot spot, and which is substantially equal to the first radio communication service. Alternatively, the second radio communication service may be radio communication service different from the first radio communication service (for example, in terms of a frequency bend to be used, a radio access technique, a provider, or the like). The second radio communication service may be provided by secondarily utilizing a frequency channel for the first radio communication service. The terminal apparatuses located within a small cell 21b can be connected to the small cell base station 20c. In the example of FIG. 1A, two terminal apparatuses 30b are connected to the small cell base station 20b, and three terminal apparatuses 30c are connected to the small cell base station 20c.

It should be noted that in the present specification, when it is not necessary to distinguish between the small cell base stations 20b and 20c, a letter of the alphabet at the end of the reference numeral will be omitted, and they are collectively referred to as a small cell base station 20. The same applies to other components such as the small cells 21b and 21c (which will be referred to as a small cell 21), and the terminal apparatuses 30a, 30b and 30c (which will be referred to as a terminal apparatus 30).

The small cell base station 20 is connected to the macro cell base station 10 via a backhaul link. The backhaul link may be a wired link or a radio link. The macro cell base station 10 is connected to a core network 5. The core network 5 includes a plurality of control nodes respectively having roles such as management of user information, management of mobility of terminals, transfer of packets and a gateway. The small cell base station 20 may be also connected to the core network 5. It should be noted that the small cell base station 20 may be connected to the core network 5 and the macro cell base station 10 via the Internet 7.

In some embodiments, the small cell base station 20 can operate at least in a first mode and in a second mode in which power is less consumed than in the first mode. In the simplest example, the first mode is an active mode. The second mode is an idle mode. In the active mode, the small cell base station 20 continuously supplies power to hardware of the small cell base station 20 including a radio communication circuit and a control circuit, so that the whole small cell base station 20 is powered "on". In the idle mode, the small cell base station 20 intermittently supplies power to at least the radio communication circuit, so that a radio communication function of the small cell base station 20 is powered "off" while power is not supplied. The second mode may be a sleep mode. In the sleep mode, the small cell base station 20 intermittently supplies power to the radio communication circuit and the control circuit, so that various functions of the small cell base station 20 including the radio communication function are powered "off" while power is not supplied. In the example of FIG. 1A, the small cell base stations 20b and 20c both operate in the active mode.

It should be noted that the technique according to the present disclosure can be applied to combination of operation modes other than the modes described herein. For example, in the idle mode or the sleep mode, any function block may be powered "on" or "off". Further, for example, when the small cell base station 20 operates using an LTE-Advanced (LTE-A) scheme, the small cell base station 20 can provide high rate radio communication service on an integrated channel formed by integrating a plurality of component carriers (CCs). As will be described later, the operation mode may support the number of CCs in such a carrier aggregation technique. For example, the first mode may be an operation mode in which more CCs are used than in the second mode. Further, as will be described later, there can be a terminal apparatus which has both functionality of a mobile station and functionality of a small cell base station (or a radio access point). Such a terminal apparatus operates as the small cell base station (or the radio access point) in one operation mode (hereinafter, referred to as a base station mode), and operates only as a mobile station in the other operation mode (hereinafter, referred to as a terminal mode). The above-described first mode and second mode may respectively correspond to the base station mode and terminal mode.

In a situation in FIG. 1A, for example, when the operation mode of the small cell base station 20b suddenly transitions to the idle mode or the sleep mode, the terminal apparatus 30*b* cannot perform communication due to absence of a serving base station until connection to another base station (for example, the macro cell base station 10) is completed. To avoid such a situation, according to the existing method, the small cell base station 20 is allowed to transition to the idle mode or the sleep mode only when there remains no terminal connected to the small cell base station 20. Referring to FIG. 1B, as a result of the terminal apparatus 30*b* located in the vicinity of the small cell base station 20*b* moving away or being powered off, no terminal connected to the small cell base station 20*b* exists. The operation of the small cell base station 20*b* thus transitions to the idle mode.

However, with a method of passively controlling the operation mode of the small cell base station 20 depending on presence of a terminal in the vicinity, it is difficult to say that sufficient power saving is achieved. In the example of FIG. 1B, only one terminal apparatus 30*a* is connected to the macro cell base station 10. Therefore, at this time, only low load falling below the capacity is applied to the macro cell base station 10. It is not efficient to keep the small cell base station 20*c* in the active mode under such a situation, in terms of power consumption of the whole system.

In embodiments which will be described later, when it is determined that load of first radio communication service provided by the macro cell base station 10 is low, the operation mode of the small cell base station 20 is made to transition to the idle mode or the sleep mode even when there is a terminal connected to the small cell base station 20. The small cell base station 20 reduces transmission power stepwisely before the operation mode transitions so as to avoid the terminal being connected from being unable to perform communication. By this means, the terminal located in the vicinity of the small cell base station 20 can switch a connection destination to another base station through execution of handover, or cell selection or cell reselection. Referring to FIG. 1C, the terminal apparatus 30*c* located in the vicinity of the small cell base station 20*c* is connected to the macro cell base station 10, and the operation mode of the small cell base station 20*c* transitions to the idle mode. As a result of the operation modes of the small cell base stations 20*b* and 20*c* both transitioning to the idle mode in the radio communication system 1 in this manner power consumed in the whole system can be largely reduced. Two illustrative embodiments for realizing such a mechanism will be described in detail in the following sections.

2. First Embodiment

In the first embodiment described in this section, the macro cell base station 10 monitors load of the first radio communication service and determines necessity of change of the operation mode. The small cell base station 20 makes the operation mode of the small cell bases station 20 transition among a plurality of modes according to an instruction from the macro cell base station 10.

2-1. Configuration Example of Macro Cell Base Station

Figure 2:
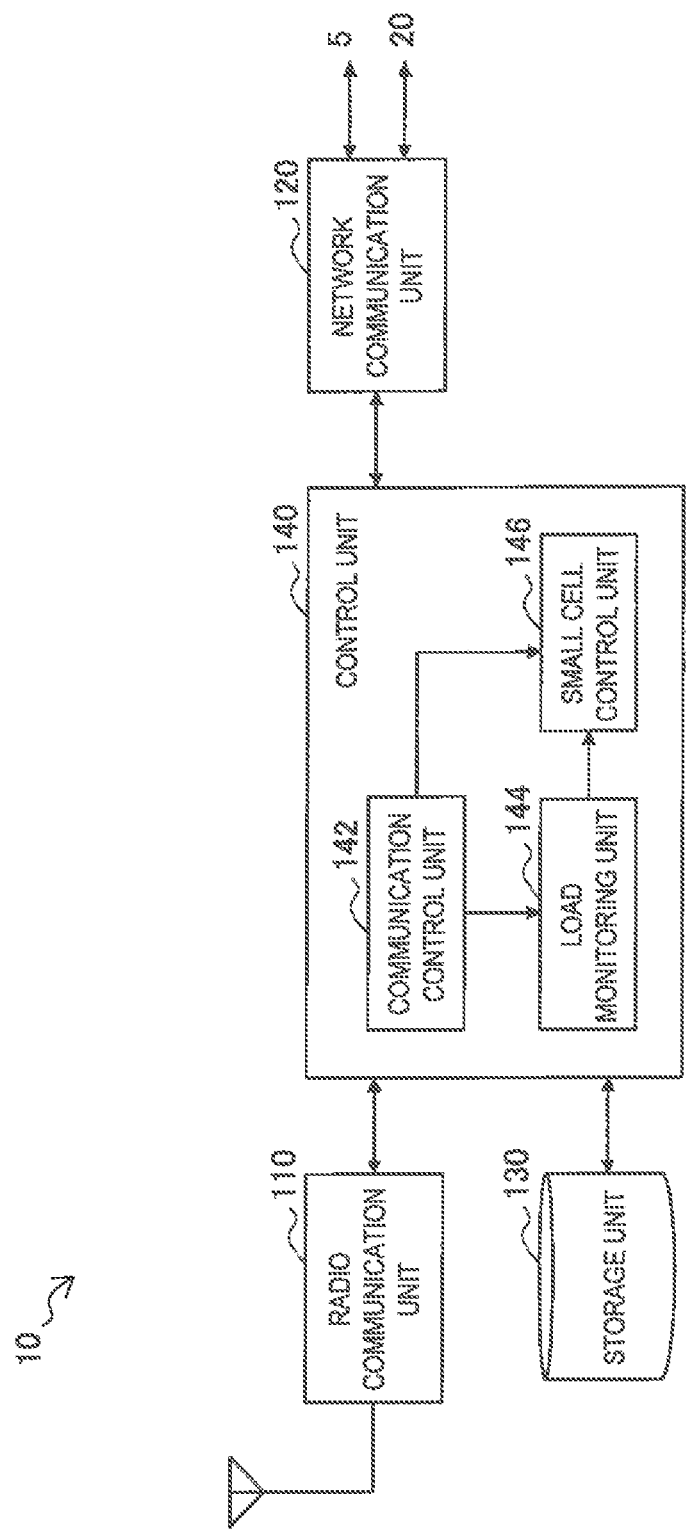
FIG. 2 is a block diagram illustrating an example of a configuration of a macro cell base station according to a first embodiment.

FIG. 2 is a block diagram illustrating an example of a configuration of the macro cell base station 10 according to the first embodiment. Referring to FIG. 2, the macro cell base station 10 includes a radio communication unit 110, a network communication unit 120, a storage unit 130 and a control unit 140.

(1) Radio Communication Unit

The radio communication unit 110 provides the first radio communication service to the terminal apparatus 30 located within the macro cell 11. For example, the radio communication unit 110 transmits a reference signal (also referred to as a beacon signal, a pilot signal or a synchronization signal) on a downlink channel. The reference signal is searched by the terminal apparatus 30 during procedure of cell selection or cell reselection. Further, the terminal apparatus 30 derives communication quality for each cell which becomes a base of handover determination by executing measurement for the reference signal. The radio communication unit 110 establishes a radio bearer (or a radio access bearer) for each of the terminal apparatuses 30 connected to the macro cell base station 10. The radio bearer receives uplink traffic from the terminal apparatus 30 on an uplink channel and transmits downlink traffic to the terminal apparatus 30 on the downlink channel.

(2) Network Communication Unit

The network communication unit 120 relays communication between the macro cell base station 10, and a control node within the core network 5, another macro cell base station and the small cell base station 20. As an example, when the macro cell base station 10 operates using an LTE scheme or an LTE-A scheme, the network communication unit 120 establishes a communication link respectively referred to as an S1-U interface and an S1-MME interface between a serving-gateway (S-GW) within the core network 5 and mobility management entity (MME). Further, the network communication unit 120 establishes a communication link referred to as an X2 interface with another macro cell base station. Still further, the network communication unit 120 establishes the above-described backhaul link with the small cell base station 20 which operates within the macro cell 11.

(3) Storage Unit

The storage unit 130 stores a program and data for operation of the macro cell base station 10 using a storage medium such as a hard disc and a semiconductor memory. The data stored in the storage unit 130 can include, for example, an index of load for the first radio communication service which will be described later and a set of thresholds to be compared with the load.

(4) Control Unit

The control unit 140 controls the whole operation of the macro cell base station 10 using a processor such as a central processing unit (CPU) and a digital signal processor (DSP). In the present embodiment, the control unit 140 includes a communication control unit 142, a load monitoring unit 144 and a small cell control unit 146.

(4-1) Communication Control Unit

The communication control unit 142 controls provision of the first radio communication service. For example, the communication control unit 142 transfers uplink data traffic received by the radio communication unit 110 from the network communication unit 120 to the core network 5 or another macro cell base station or the small cell base station 20 according to the address. Further, the communication control unit 142 transmits downlink data traffic received from other nodes by the network communication unit 120 from the radio communication unit 110 to the terminal apparatus 30 to which the downlink data traffic is addressed. Further, the communication control unit 142 performs control so that the radio communication unit 110 receives a report (for example, a measurement report or a channel quality indicator (CQI)) indicating downlink communication quality measured by the terminal apparatus 30. Further, the communication control unit 142 performs control so that the radio communication unit 110 measures uplink communication quality.

(4-2) Load Monitoring Unit

The load monitoring unit 144 monitors load of the first radio communication service provided by the macro cell base station 10. The load monitoring unit 144 then determines whether the load of the first radio communication service satisfies conditions defined in advance for transition of the operation mode of the small cell base station 20. Determination of the conditions is typically executed periodically. Determination of the conditions may be separately performed for each of partial regions included in the macro cell 11. Here, three methods for monitoring the load of the first radio communication service will be described using FIG. 3A to FIG. 3C.

(4-2-1) First Method

Figure 3A:
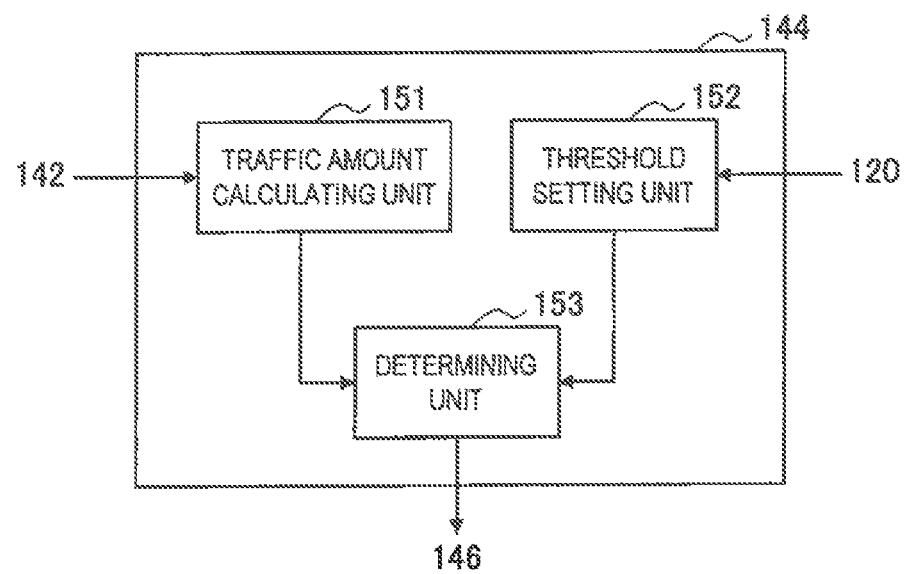
FIG. 3A is a block diagram illustrating a first example of a detailed configuration of a load monitoring unit illustrated in FIG. 2.

FIG. 3A is a block diagram illustrating a first example of a detailed configuration of the load monitoring unit 144 illustrated in FIG. 2. Referring to FIG. 3A, the load monitoring unit 144 has a traffic amount calculating unit 151, a threshold setting unit 152 and a determining unit 153.

The traffic amount calculating unit 151 calculates amounts of uplink traffic and downlink traffic processed by the radio communication unit 110 for each time window. A length of the time window may be defined in advance, for example, in terms of a slot, a subframe or a radio frame. The calculated traffic amount may be a total value, a time average, a moving average or a maximum value. The traffic amount calculating unit 151 typically normalizes the latest calculation result of the traffic amount at a maximum value corresponding to the capacity of the macro cell 11 and outputs the normalized traffic amount to the determining unit 153.

The threshold setting unit 152 sets a threshold constituting the determination conditions for determining the load of the first radio communication service at the determining unit 153. The threshold setting unit 152 may set a fixed threshold. Alternatively, the threshold setting unit 152 may set a threshold designated by a control message received from other nodes (for example, a control node within the core network 5) via the network communication unit 120 at the determining unit 153. When the traffic amount is normalized as described above, a threshold to be compared with the normalized traffic amount falls within a range from 0 to 1. A first threshold to be compared with the traffic amount of the first radio communication service for switching from the first mode (for example, the active mode) to the second mode (for example, the idle mode) may be a value lower than a second threshold for switching from the second mode to the first mode. As an example, when the first threshold is 0.4 (40% of the maximum value of the capacity) and an offset between thresholds is 0.1, the second threshold is 0.5 (50% of the maximum value of the capacity). With such hysteresis control, it is possible to avoid a risk that the operation mode is excessively frequently switched between the two modes when the value of the traffic amount is close to the threshold.

The determining unit 153 determines whether the determination conditions for transition of the operation mode of the small cell base station 20 by comparing the traffic amount inputted from the traffic amount calculating unit 151 with the threshold set by the threshold setting unit 152. For example, the determining unit 153 can determine whether the latest traffic amount of the macro cell 11 falls below a first threshold to determine whether to make the operation mode of the small cell base station 20 transition to the second mode in which power is less consumed in the case where the small cell base station 20 operates in the first mode. When the latest traffic amount falls below the first threshold, because the load of the first radio communication service is sufficiently low, it is possible to reduce power consumption of the whole system by making the operation mode of the small cell base station 20 transition to the second mode. Further, the determining unit 153 can determine whether the latest traffic amount of the macro cell 11 exceeds a second threshold to determine whether to make the operation mode of the small cell base station 20 transition to the first mode in the case where the small cell base station 20 operates in the second mode. When the latest traffic amount exceeds the second threshold, because the load of the first radio communication service is considerably high, it is possible to distribute the load (partially off-loads traffic) by making the operation mode of the small cell base station 20 transition to the first mode. When determining that the determination conditions are satisfied, the determination unit 153 outputs the determination result to the small cell control unit 146.

(4-2-2) Second Method

Figure 3B:
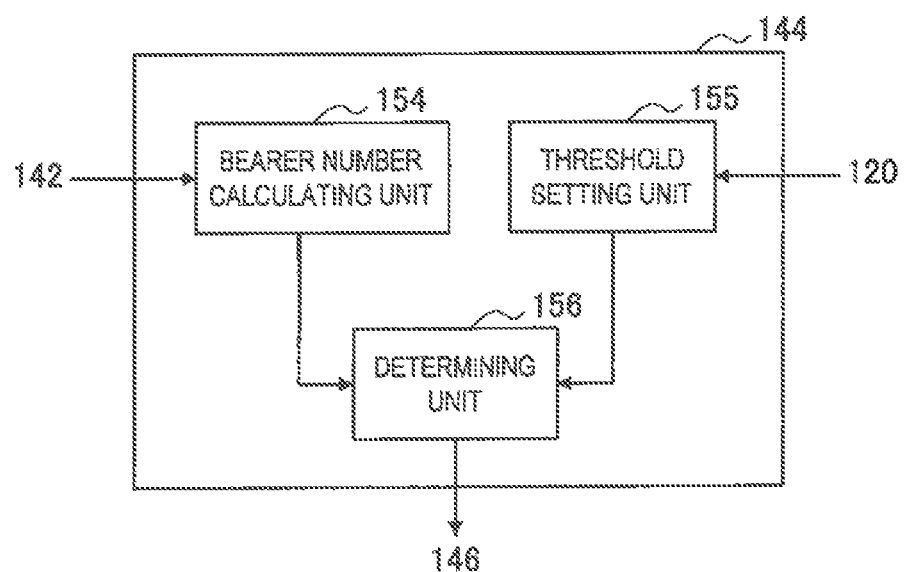
FIG. 3B is a block diagram illustrating a second example of a detailed configuration of a load monitoring unit illustrated in FIG. 2.

FIG. 3B is a block diagram illustrating a second example of a detailed configuration of the load monitoring unit 144 illustrated in FIG. 2. Referring to FIG. 3B, the load monitoring unit 144 has a bearer number calculating unit 154, a threshold setting unit 155 and a determining unit 156.

The bearer number calculating unit 154 calculates the number of active radio bearers established by the radio communication unit 110 for each time window. A length of the time window may be defined in advance, for example, in terms of a slot, a subframe or a radio frame. The calculated number of bearers may be a time average, a moving average or a maximum value in each time window. The bearer number calculating unit 154 typically normalizes the latest calculation result of the number of radio bearers with a maximum value corresponding to the capacity of the macro cell 11 and outputs the normalized number of bearers to the determining unit 156. It should be noted that the number of radio bearers practically becomes larger when the number of terminals being connected to the macro cell base station 10 is larger. Therefore, in place of the number of radio bearers, it is also possible to use the number of terminals being connected.

The threshold setting unit 155 sets a threshold constituting determination conditions for determining the load of the first radio communication service at the determining unit 156. The threshold setting unit 155 may set a fixed threshold. Alternatively, the threshold setting unit 155 may set a threshold designated by a control message received from other nodes via the network communication unit 120 at the determining unit 156. When the number of radio bearers is normalized as described above, a threshold to be compared with the normalized number of radio bearers falls within a range from 0 to 1. A first threshold to be compared with the number of radio bearers of the first radio communication service for switching from the first mode (for example, the active mode) to the second mode (for example, the idle mode) may be a value lower than a second threshold for switching from the second mode to the first mode.

The determining unit 156 determines whether the determination conditions for transition of the operation mode of the small cell base station 20 by comparing the number of radio bearers inputted from the bearer number calculating unit 154 with the threshold set by the threshold setting unit 155. For example, the determining unit 156 can determine whether the latest number of radio bearers of the macro cell 11 falls below a first threshold to determine whether to make the operation mode of the small cell base station 20 transition to the second mode in which power is less consumed in the case where the small cell base station 20 operates in the first mode. When the latest number of radio bearers falls below the first threshold, because the load of the first radio communication service is sufficiently low, it is possible to reduce power consumption of the whole system by making the operation mode of the small cell base station 20 transition to the second mode. Further, the determining unit 156 can determine whether the latest number of radio bearers of the macro cell 11 exceeds a second threshold to determine whether to make the operation mode of the small cell base station 20 transition to the first mode in the case where the small cell base station 20 operates in the second mode. When the latest number of radio bearers exceeds the second threshold, because the load of the first radio communication service is considerably high, it is possible to distribute the load by making the operation mode of the small cell base station 20 transition to the first mode. When determining that the determination conditions are satisfied, the determination unit 156 outputs the determination result to the small cell control unit 146.

(4-2-3) Third Method

Figure 3C:
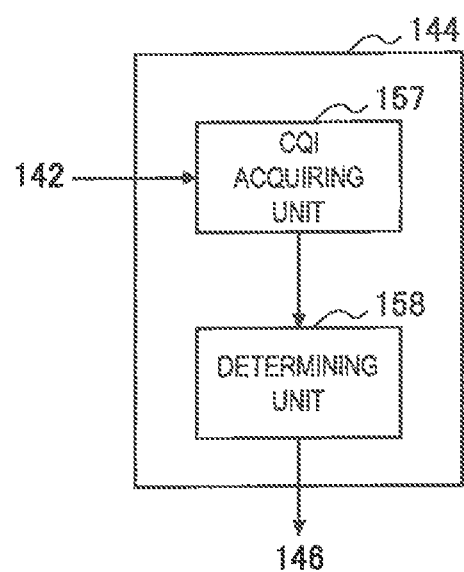
FIG. 3C is a block diagram illustrating a third example of a detailed configuration of a load monitoring unit illustrated in FIG. 2.

FIG. 3C is a block diagram illustrating a third example of a detailed configuration of the load monitoring unit 144 illustrated in FIG. 2. Referring to FIG. 3C, the load monitoring unit 144 has a CQI acquiring unit 157 and a determining unit 158.

The CQI acquiring unit 157 acquires a measurement result of communication quality measured in the first radio communication service from the radio communication unit 110. The measurement result of the communication quality acquired by the CQI acquiring unit 157 may be, for example, a CQI. When the communication quality indicated by the CQI is more favorable, the radio communication unit 110 can perform communication with the terminal using a higher-order modulation scheme at a higher coding rate (as an example, in the LTE scheme, 16 types of values of the CQI are defined). Therefore, when an average value of CQIs reported from one or more terminals within a certain area is sufficiently high, excessive load is less likely to be applied to the first radio communication service even when the small cell base station 20 is not utilized in the area. The CQI acquiring unit 157, for example, calculates the communication quality indicated by the CQIs reported from the terminals for each time window. A length of the time window may be defined in advance, for example, in terms of a slot, a subframe or a radio frame. The calculated communication quality may be an average value in each time window. The CQI acquiring unit 157 outputs the calculated value of the communication quality or the acquired CQI itself to the determining unit 158.

The determining unit 158 determines whether the determination conditions for making the operation mode of the small cell base station 20 transition are satisfied based on an index relating to the communication quality inputted from the CQI acquiring unit 157. For example, the determining unit 158 can determine whether the inputted communication quality exceeds a predetermined threshold to determine whether to make the operation mode of the small cell base station 20 transition to the second mode in which power is less consumed in the case where the small cell base station 20 operates in the first mode. The determining unit 158 may compare the number or a ratio of terminals which experience poor communication quality with a threshold. When the determination conditions based on such communication quality are satisfied, the determining unit 158 can determine whether to make the operation mode of the small cell base station 20 transition to the second mode. Meanwhile, in the case where the small cell base station 20 operates in the second mode, the determining unit 158 can determine that the operation mode of the small cell base station 20 should be made to transition to the first mode when the inputted communication quality falls below a predetermined threshold or the number or a ratio of terminals which experience poor communication quality exceeds a predetermined threshold. When determining that the determination conditions are satisfied, the determining unit 158 outputs the determination result to the small cell control unit 146.

(4-3) Small Cell Control Unit

The small cell control unit 146 controls operation of one or more small cell base stations 20 located within the macro cell 11. For example, the small cell control unit 146 controls an operation mode of each of the small cell base stations 20 based on the load of the first radio communication service monitored by the load monitoring unit 144. The small cell control unit 146 may dynamically control the operation mode of each of the small cell base stations 20, for example, in units of an arbitrary time period such as a slot, a subframe and a radio frame. Further, the small cell control unit 146 can control transmission power of each of the small cell base stations 20. For example, the small cell control unit 146 can stepwisely reduce transmission power of the reference signal to be transmitted from the small cell base station 20 when making the operation mode of the small cell base station 20 transition from the first mode to the second mode in which power is leas consumed than in the first mode.

FIG. 4A to FIG. 4D respectively illustrate examples of transition between the operation modes of the small cell base station 20. In the first example illustrated in FIG. 4A, the small cell base station 20 can operate in the active mode M11 and the idle mode M12. While, in the active mode M11, the whole circuit of the small cell base station 20 continuously operates, because, in the idle mode M12, at least a circuit for radio communication of the small cell base station 20 intermittently operates, power consumption in the idle mode M12 is smaller than that in the active mode M11. When the operation mode of the small cell base station 20 transitions from the active mode M11 to the idle mode M12 (thick arrow in the figure), the small cell base station 20 stepwisely reduces transmission power of the reference signal to be transmitted from the small cell base station 20 to enable smooth handover of terminals being connected to the small cell base station 20, cell selection or cell reselection. Meanwhile, when the operation mode of the small cell base station 20 transitions from the idle mode M12 to the active mode M11 (thin arrow in the figure), the small cell base station 20 may increase transmission power of the reference signal in a non-stepwise manner (until a setting value aimed in one step).

Figure 4A:
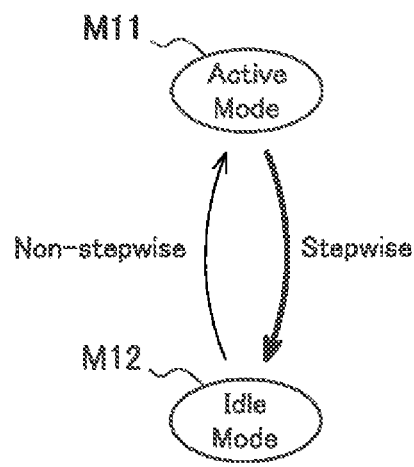
FIG. 4A is an explanatory diagram for explaining a first example of transition between operation modes of a small cell base station.
Figure 4B:
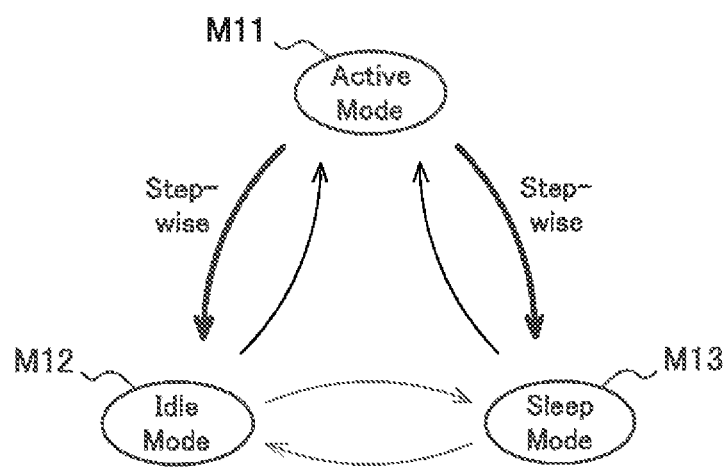
FIG. 4B is an explanatory diagram for explaining a second example of transition between operation modes of a small cell base station.

In the second example illustrated in FIG. 4B, the small cell base station 20 can operate in the active mode M11, the idle mode M12 and the sleep mode M13. In the sleep mode M13, because a circuit for control as well as a circuit for radio communication intermittently operate, power consumption in the sleep mode M13 is lower than that in the active mode M11 and the idle mode M12. When the operation mode of the small cell base station 20 transitions from the active mode M11 to the idle mode M12 or the sleep mode M13 (thick arrow in the figure), the small cell base station 20 stepwisely reduces transmission power of the reference signal to be transmitted from the small cell base station 20 to enable smooth handover of terminals being connected to the small cell base station 20, cell selection or cell reselection.

Figure 4C:
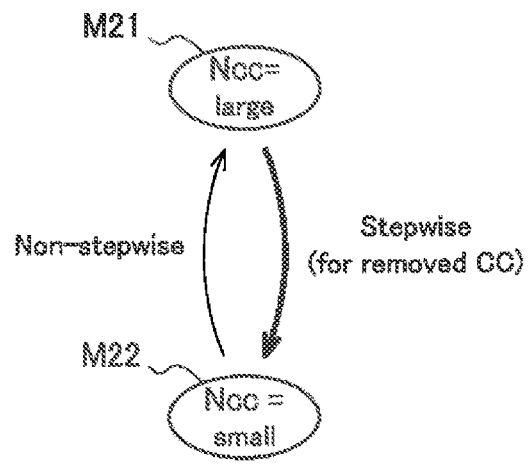
FIG. 4C is an explanatory diagram for explaining a third example of transition between operation modes of a small cell base station.

In the third example illustrated in FIG. 4C, $N_{cc}$ means the number of component carriers constituting an integrated channel formed by the small cell base station 20. $N_{cc}$ may be an arbitrary integer of one or greater. The small cell base station 20 can operate in a high aggregation mode M21 with greater $N_{cc}$ and a low aggregation mode M22 with smaller $N_{cc}$. While, in the high aggregation mode M21, a radio signal is transmitted over a wider frequency band, because, in the low aggregation mode M22, a radio signal is transmitted over a narrower frequency band, power consumption in the low aggregation mode M22 is smaller than that in the high aggregation mode M21. When the operation mode of the small cell base station 20 transitions from the high aggregation mode M21 to the low aggregation mode M22 (thick arrow in the figure), the small cell base station 20 stepwisely reduces transmission power of the reference signal of a component carrier to be removed to enable smooth handover of terminals being connected to the small cell base station 20 on the component carrier to be removed, cell selection or cell reselection. Meanwhile, when the operation mode of the small cell base station 20 transitions from the low aggregation mode M22 to the high aggregation mode M21 (thin arrow in the figure), the small cell base station 20 may reduce transmission power of the reference signal of the component carrier to be added in a non-stepwise manner.

Figure 4D:
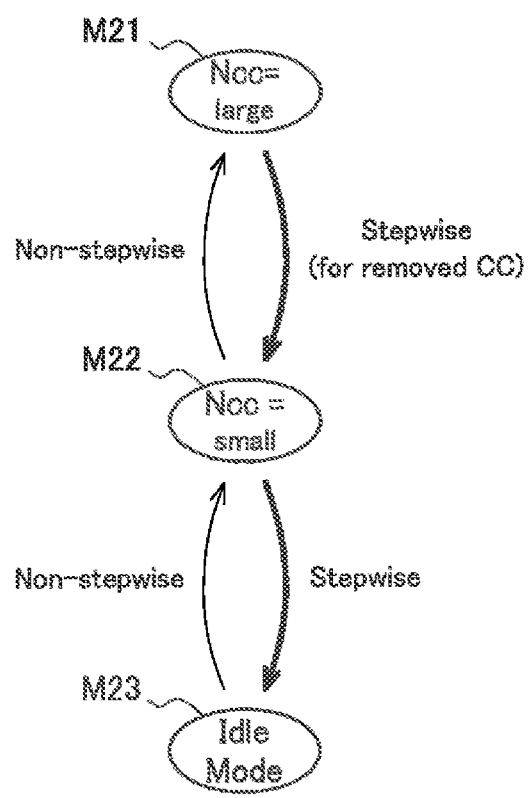
FIG. 4D is an explanatory diagram for explaining a fourth example of transition between operation modes of a small cell base station.

In the fourth example illustrated in FIG. 4D, the small cell base station 20 can operate in the high aggregation mode M21, the low aggregation mode M22 and the idle mode M23. In the idle mode M21, because no component carrier is activated, power consumption in the idle mode M23 is smaller than that in other two operation modes. When the operation mode of the small cell base station 20 transitions from the high aggregation mode M21 to the low aggregation mode M22, the small cell base station 20 stepwisely reduces transmission power of a reference signal of a component carrier to be removed to enable smooth handover of terminals being connected to the small cell base station 20 on the component carrier to be removed, cell selection or cell reselection. Further, when the operation mode of the small cell base station 20 transitions from the low aggregation mode M22 to the idle mode M23, the small cell base station 20 stepwisely reduces the transmission power of the reference signal of the component carrier to be removed in a similar manner.

Stepwise reduction of the transmission power of the reference signal from the small cell base station 20 as described using FIG. 4A to FIG. 4D may be realized through tight transmission power control by the small cell control unit 146. Alternatively, the small cell control unit 146 may provide only a control message giving an instruction of transition of the operation mode, and the small cell base station 20 receiving the control message may autonomously reduce the transmission power stepwisely. When the control message giving an instruction of transmission of the operation mode is generated by the small cell control unit 146, the generated control message is transmitted to a target small cell base station 20 via the network communication unit 120 and the backhaul link.

2-2. Configuration Example of Small Cell Base Station

FIG. 5 is a block diagram illustrating an example of the configuration of the small cell base station 20 according to the first embodiment. Referring to FIG. 5, the small cell base station 20 includes a radio communication unit 210, a network communication unit 220, a storage unit 230 and a control unit 240.

(1) Radio Communication Unit

The radio communication unit 210 provides second radio communication service to the terminal apparatus 30 located within the small cell 21 provided so as to overlap with the macro cell 11. For example, the radio communication unit 210 transmits a reference signal on a downlink channel. The reference signal is searched by the terminal apparatus 30 during procedure of cell selection or cell reselection. Further, the terminal apparatus 30 derives communication quality for each cell which becomes a base of handover determination by executing measurement for the reference signal.

(2) Network Communication Unit

The network communication unit 220 establishes a backhaul link with the macro cell base station 10 and relays communication between the small cell base station 20 and the macro cell base station 10.

(3) Storage Unit

The storage unit 230 stores a program and data for operation of the small cell base station 20 using a storage medium such as a hard disc and a semiconductor memory.

(4) Control Unit

The control unit 240 controls the whole operation of the small cell base station 20 using a processor such as a CPU and a DSP. In the present embodiment, the control unit 240 includes a communication control unit 242 and an operation mode setting unit 244.

The communication control unit 242 controls provision of the second radio communication service. For example, the communication control unit 242 performs control so that uplink data traffic received by the radio communication unit 210 is transferred from the network communication unit 220 to the macro cell base station 10 according to the address. Further, the communication control unit 242 performs control so that downlink data traffic received from other nodes by the network communication unit 220 is transmitted from the radio communication unit 210 to the terminal apparatus 30 to which the downlink data traffic is addressed. Further, the communication control unit 242 performs control so that the radio communication unit 210 receives a report (for example, a measurement report or a CQI report) indicating downlink communication quality measured by the terminal apparatus 30. Further, the communication control unit 242 performs control so that the radio communication unit 210 measures uplink communication quality.

The operation mode setting unit 244 sets an operation mode which can be selected from a set of the operation modes illustrated in FIG. 4A to FIG. 4D at the small cell base station 20. In the present embodiment, when the network communication unit 220 receives a control message which gives an instruction of transition of the operation mode from the macro cell base station 10, the operation mode setting unit 244 makes the operation mode of the small cell base station 20 transition according to the control message.

When the operation mode setting unit 244 makes the operation mode of the radio communication unit 210 transition from a first mode to a second mode in which power is less consumed than in the first mode, the communication control unit 242 stepwisely reduces transmission power of a reference signal to be transmitted from the radio communication unit 210. When the second mode is a low aggregation mode as described using FIG. 4C, the reference signal described here may be a reference signal of a component carrier to be removed. The communication control unit 242 then stands by over a predetermined time period every time the transmission power of the reference signal is reduced by one step. A duration of the standby period here may be, for example, a duration corresponding to a transmission cycle corresponding to several times of transmission of the reference signal. During this standby period, the terminal apparatus 30 connected to the second radio communication service executes handover, cell selection or cell reselection to switch a connection destination from the small cell base station 20 to another base station (or from a component carrier to be removed to another component carrier). The communication control unit 242 confirms the number of the terminal apparatuses 30 which utilize the second radio communication service while stepwise reducing transmission power of the reference signal, and, after the number of the terminal apparatuses 30 becomes 0, the communication control unit 242 switches the operation mode of the radio communication unit 210 to the second mode. Through such procedure, the small cell base station 20 can switch the operation mode to a mode in which power is less so consumed without passively waiting until there remains no active terminals being connected, and without making the terminals being connected unable to perform communication. The terminals can sense a situation as if the small cell base station 20 moved away (as if the terminals moved away from the small cell base station 20). Such a mechanism does not depend on whether handover, cell selection or cell reselection is voluntarily executed at a terminal side or controlled at a network side. Therefore, for example, compared to a method in which the small cell base station 20 issues a mandatory handover instruction to the terminal apparatus 30, the above-described mechanism is beneficial.

Reduction of the transmission power of the reference signal in one step may be a fixed value such as, for example, 5 dB. Alternatively, the reduction may be a value changing depending on an absolute value of the transmission power (for example, when the transmission power falls within a range from −20 dBm to 0 dBm, the value may be 5 dB, and, when the transmission power falls within a range from −60 dBm to −20 dBm, the value may be 2 dB). Further, the communication control unit 242 may dynamically set reduction of the transmission power in one step according to a parameter such as, for example, the number of terminals being connected and communication quality. By this means, it is possible to achieve optimal balance between smooth transition of the operation mode and a period required for completing transition of the mode.

As described above, in the present embodiment, the communication control unit 242 switches the operation mode according to an instruction included in the control message received from the macro cell base station 10 which monitors the load of the first radio communication service. When the radio communication unit 210 operates in the first mode, and it is determined that the load of the first radio communication service is low, the operation mode is switched to the second mode. When the radio communication unit 210 operates in the second mode, and it is determined that the load of the first radio communication service is high, the operation mode is switched to the first mode. According to this configuration, it is not necessary to transmit an index relating to the load of the first radio communication service from the macro cell base station 10 to the small cell base station 20, so that it is possible to reduce overhead of signaling required for control of the operation mode. Further, because a logic for conditions determination relating to the load of the first radio communication service is only required to be implemented at the macro cell base station 10, it is possible to realize the above-described mechanism at relatively low cost.

It should be noted that, regardless of the load of the first radio communication service, when it is determined that communication quality measured for the second radio communication service within the small cell 21 can be further reduced, the communication control unit 242 may reduce the transmission power of the reference signal to be transmitted from the radio communication unit 210 without making the operation mode transition. For example, when the communication quality reported from the terminal apparatus 30 connected to the small cell base station 20 is well above a desired quality level, it can be determined that the communication quality can be farther reduced. In such a case, it is possible to reduce power consumed by the small cell base station 20 also by reducing the transmission power of the reference signal. Further, interference between the small cell and a cell in the vicinity can be reduced.

2-3. Configuration Example of Terminal Apparatus

After the radio communication unit of the terminal apparatus 30 is powered on or restored from the idle mode or the sleep mode to the active mode, the radio communication unit selects a cell of a connection destination by executing cell selection procedure. Typically, in the cell selection procedure, all the frequency channels are searched, and identification of a cell and measurement of reception power are performed for each of the detected reference signals. When reception power of a reference signal received from the macro cell base station 10 is the largest, the terminal apparatus 30 utilizes the first radio communication service provided by the macro cell base station 10. When reception power of a reference signal of the small cell base station 20 is larger than the reception power of the reference signal from the macro cell base station 10, the terminal apparatus 30 utilizes the second radio communication service provided by the small cell base station 20. The terminal apparatus 30 may periodically measure communication quality for the cell of the connection destination and one or more cells in the vicinity and execute cell reselection. Further, when the communication quality which is measured for the cell of the connection destination and one or more cells in the vicinity while the terminal apparatus 30 operates in the active mode satisfies predetermined handover conditions, the terminal apparatus 30 may switch the cell of the connection destination by executing handover procedure. The control unit of the terminal apparatus 30 controls execution of such cell selection, cell reselection and handover.

Here, it is assumed that the terminal apparatus 30 is currently connected to the small cell base station 20. In the present embodiment, during process in which the operation mode of the small cell base station 20 transitions from the first mode to the second mode in which power is less consumed than in the first mode, transmission power of the reference signal received by the terminal apparatus 30 is reduced stepwise. The terminal apparatus 30 continuously measures reception power (and communication quality depending on the reception power) of the reference signal from the small cell base station 20 also while the transmission power is reduced. The terminal apparatus 30 then switches the connection destination of the radio communication unit from the small cell base station 20 which is a current serving base station to another base station at a certain timing (or switches a primary CC to another CC).

During such procedure, the terminal apparatus 30 neither loses packets, nor is put into a state where communication is impossible.

2-4. Processing Flow (Macro Cell Base Station)

In this section, an example of processing flow executed by the macro cell base station 10 in the first embodiment will be described. In first scenario, the small cell base station 20 can operate in the active mode and the idle mode. In second scenario, the small cell base station 20 can operate in the high aggregation mode, the low aggregation mode, and the idle mode.

(1) First Scenario

Figure 6A:
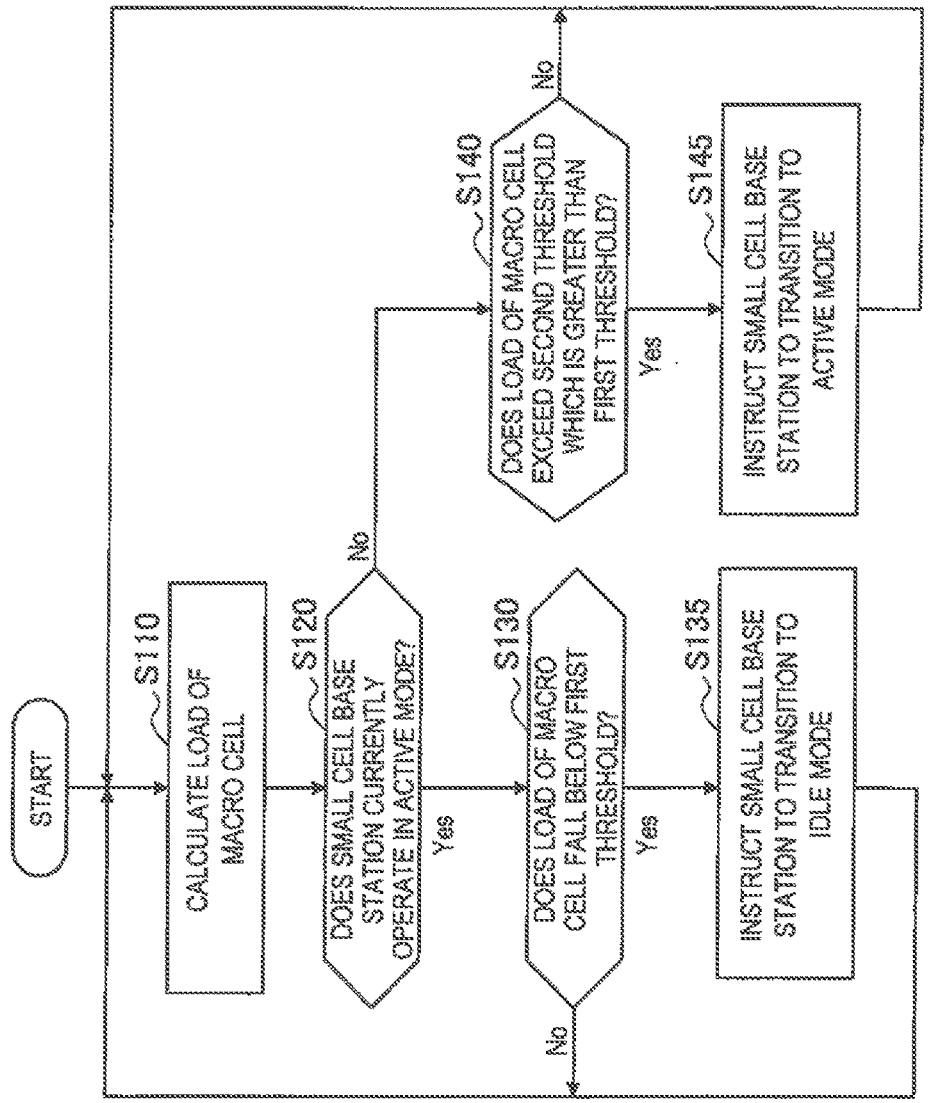
FIG. 6A is a flowchart illustrating an example of flow in first scenario of communication control processing executed by a macro cell base station according to the first embodiment.

FIG. 6A is a flowchart illustrating an example of flow in the first scenario of communication control processing executed by the macro cell base station 10 according to the first embodiment. The communication control processing illustrated in FIG. 6A is processing which can be periodically executed for one small cell base station 20. Actually, the communication control processing described here may be executed for each of one or more small cell base stations 20.

First, the load monitoring unit 144 calculates the latest load of the first radio communication service provided in the macro cell 11 (step S110). The load of the first radio communication service may be calculated in terms of any of a traffic amount, the number of radio bearers, the number of terminals being connected and communication quality.

The processing thereafter branches depending on whether the small cell base station 20 currently operates in the active mode or in the idle mode (step S120). When the small cell base station 20 currently operates in the active mode, the load monitoring unit 144 compares the load of the macro cell 11 calculated in step S110 with a first threshold (step S130). When the load of the macro cell 11 falls below the first threshold, the small cell control unit 146 instructs the small cell base station 20 to make the operation mode transition to the idle mode (step S135).

When the small cell base station 20 currently operates in the idle mode, the load monitoring unit 144 compares the load of the macro cell 11 calculated in step S110 with a second threshold which is greater than the first threshold (step S140). When the load of the macro cell 11 exceeds the second threshold, the small cell control unit 146 instructs the small cell base station 20 to make the operation mode transition to the active mode (step S145).

(2) Second Scenario

Figure 6B:
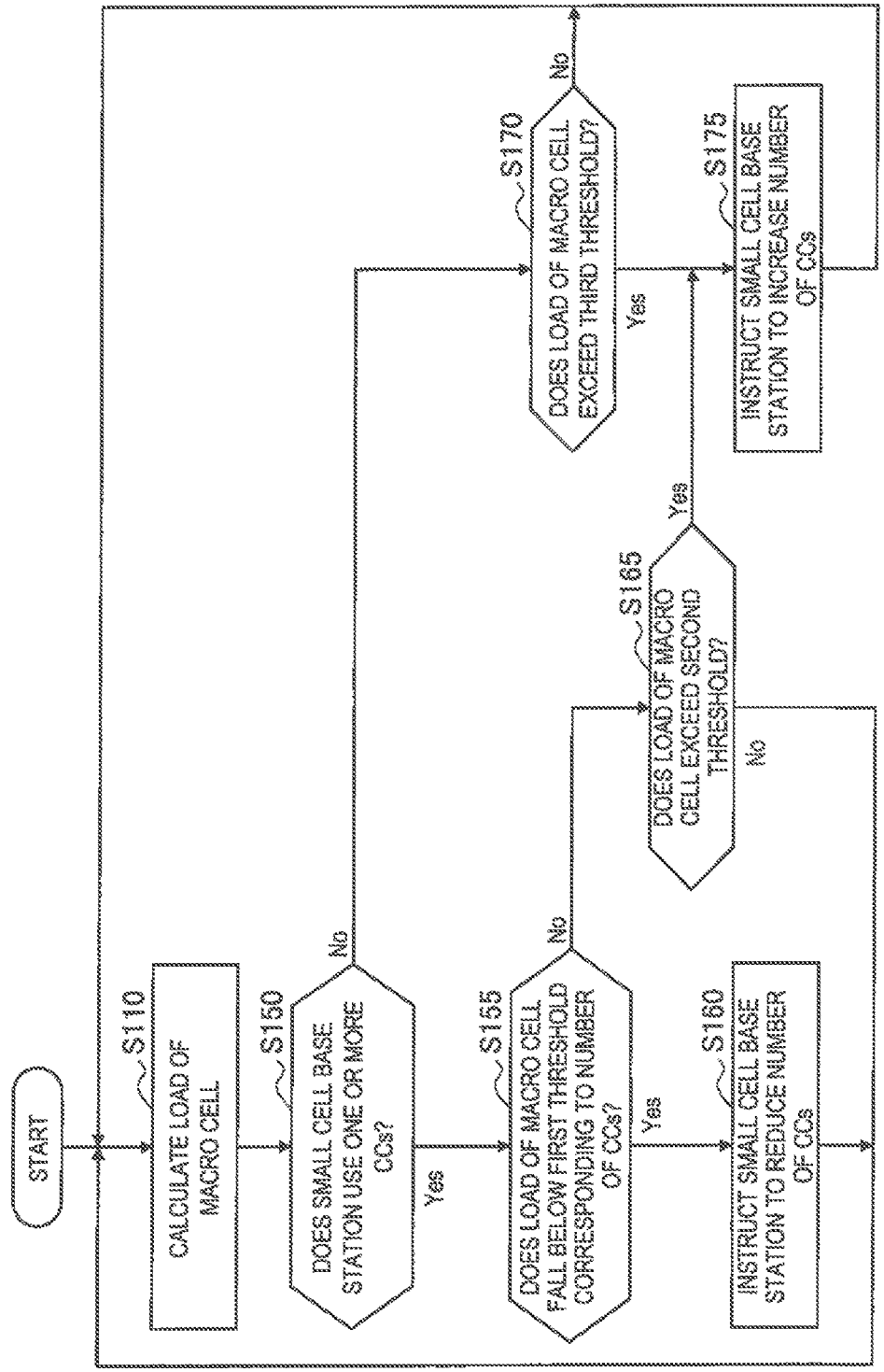
FIG. 6B is a flowchart illustrating an example of flow in second scenario of communication control processing executed by a macro cell base station according to the first embodiment.

FIG. 6B is a flowchart illustrating an example of flow in the second scenario of communication control processing executed by the macro cell base station 10 according to the first embodiment. The communication control processing illustrated in FIG. 6B is processing which can be periodically executed for one small cell base station 20. Actually, the communication control processing described here may be executed for each of one or more small cell base stations 20.

First, the load monitoring unit 144 calculates the latest load of the first radio communication service provided in the macro cell 11 (step S110). The load of the first radio communication service may be calculated in terms of any of a traffic amount, the number of radio bearers, the number of terminals being connected and communication quality.

The processing thereafter branches depending on whether the small cell base station 20 currently uses one or more component carriers (step S150). When the small cell base station 20 currently uses one or more component carriers, the load monitoring unit 144 compares the load of the macro cell 11 calculated in step S110 with a first threshold corresponding to the number of CCs at that time (step S155). When the load of the macro cell 11 falls below the first threshold, the small cell control unit 146 instructs the small cell base station 20 to reduce the number of CCs (remove any CC) (step S160). By this means, the operation mode of the small cell base station 20 transitions from the high aggregation mode to the low aggregation mode, or transitions from the low aggregation mode to the idle mode. It should be noted that a determination threshold for the former transition may be different from a determination threshold for the latter transition.

When the load of the macro cell 11 does not fall below the first threshold, the load monitoring unit 144 compares the load of the macro cell 11 with a second threshold which is greater than the first threshold (step S165). When the load of the macro cell 11 exceeds the second threshold, the small cell control unit 146 instructs the small cell base station 20 to increase the number of CCs (add a new CC) (step S175). By this means, the operation mode of the small cell base station 20 transitions from the low aggregation mode to the high aggregation mode. It should be noted that when the small cell base station 20 has already operated in the high aggregation mode, determination in step S165 may be skipped.

When the small cell base station 20 currently operates in the idle mode, the small cell base station 20 does not use any CC. In this case, the load monitoring unit 144 compares the load of the macro cell 11 with a third threshold (step S140). When the load of the macro cell 11 exceeds the third threshold, the small cell control unit 146 instructs the small cell base station 20 to increase the number of CCs (add a new CC) (step S175). By this means, the operation mode of the small cell base station 20 transitions from the idle mode to the low aggregation mode or the high aggregation mode.

2-5. Processing Flow (Small Cell Base Station)

In this section, an example of processing flow executed by the small cell base station 20 in the first embodiment will be described. First scenario and second scenario in this section respectively correspond to the first scenario and the second scenario in the previous section.

(1) First Scenario

FIG. 7A is a flowchart illustrating an example of flow of the first scenario of communication control processing executed by the small cell base station 20 according to the first embodiment.

First, the operation mode setting unit 244 waits for reception of a control message from the macro cell base station 10 (step S210). When the control message giving an instruction to make the operation mode transition is received by the network communication unit 220 from the macro cell base station 10, processing proceeds to step S220.

The processing thereafter branches depending on in which of the active mode and the idle mode, the small cell base station 20 currently operates (step S220). When the small cell base station 20 currently operates in the active mode, the operation mode setting unit 244 determines whether an instruction to transition to the idle mode is issued by the control message (step S225). When an instruction to transition to the idle mode is issued, the communication control unit 242 stepwisely reduces transmission power of a reference signal to be transmitted from the radio communication unit 210 (step S230). The operation mode setting unit 244 then sets the operation mode of the small cell base station 20 to the idle mode (step S235).

When the small cell base station 20 currently operates in the idle mode, the operation mode setting unit 244 determines whether an instruction to transition to the active mode is issued by the control message (stop S240). When an instruction to transition to the active mode is issued, the operation mode setting unit 244 sets the operation mode of the small cell base station 20 to the active mode (step S245).

Figure 7B:
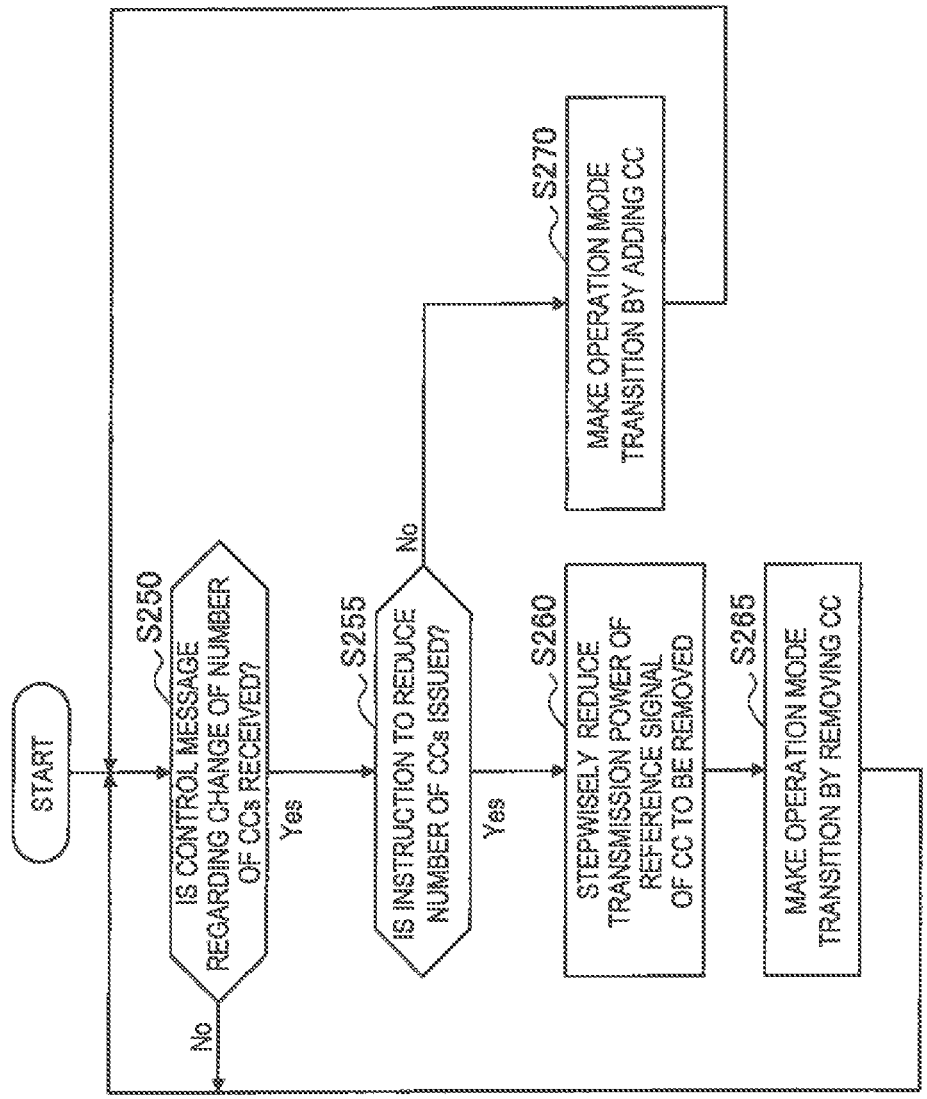
FIG. 7B is a flowchart illustrating an example of flow in second scenario of communication control processing executed by the small cell base station according to the first embodiment.
Figure 8A:
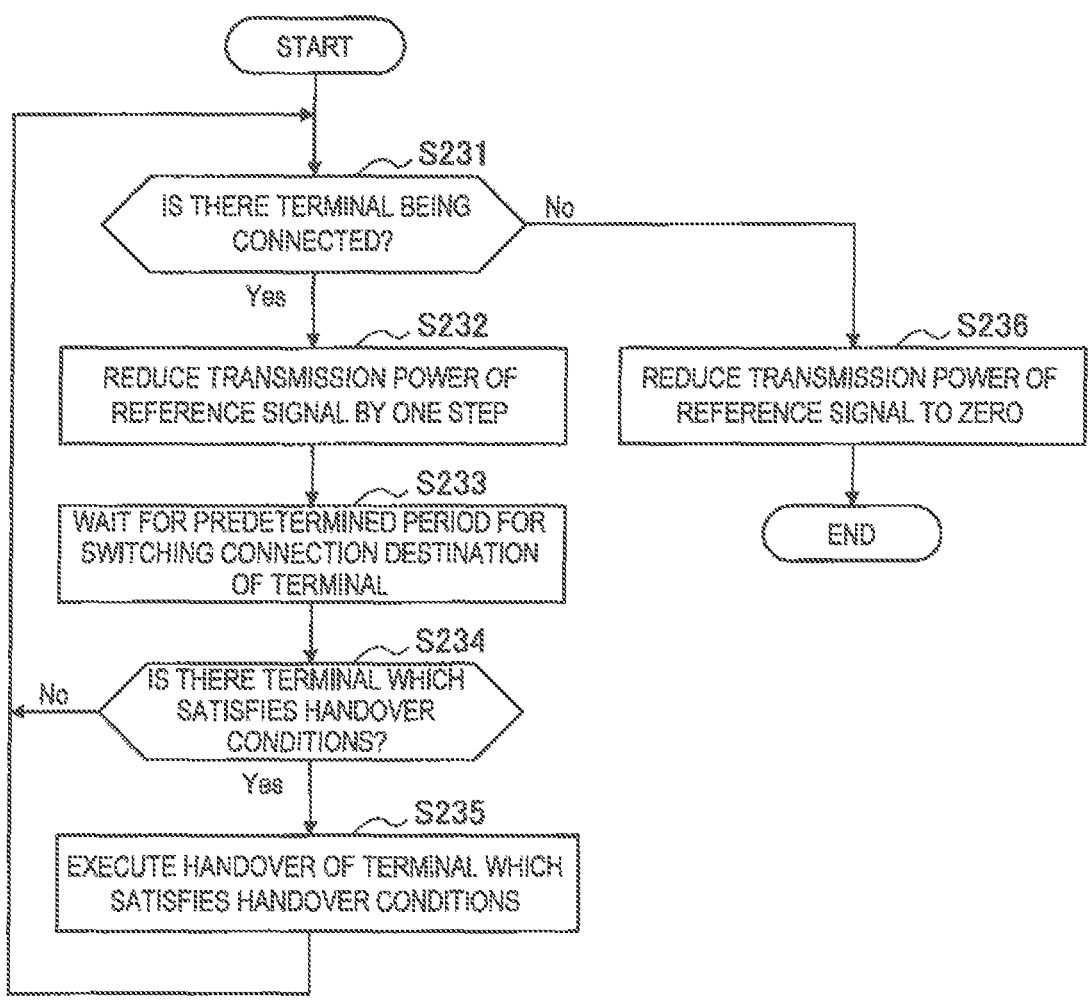
FIG. 8A is a flowchart illustrating an example of detailed flow of processing for transition to an operation mode in which power is less consumed in the first scenario.

FIG. 8A is a flowchart illustrating an example of detailed flow of processing corresponding to step S230 in FIG. 7A.

Referring to FIG. 8A, first, the communication control unit 242 determines whether there is a terminal apparatus 30 which utilizes the second radio communication service in the small cell 21 (step S231). Here, when there is no terminal apparatus 30 which utilizes the second radio communication service, the communication control unit 242 reduces transmission power of a reference signal to be transmitted from the radio communication unit 210 to 0 (step S236).

When there is a terminal apparatus 30 which utilizes the second radio communication service, the communication control unit 242 reduces the transmission power of the reference signal to be transmitted from the radio communication unit 210 by one step (step S232). The communication control unit 242 then stands by over a predetermined period to switch the connection destination of the terminal apparatus 30 (step S233). During this period, the terminal apparatus can execute cell selection or cell reselection. Further, when a terminal apparatus 30 which satisfies handover conditions occurs as a result of reduction of the transmission power (step S234), the communication control unit 242 executes handover to a target base station in collaboration with the terminal apparatus 30 (step S235). Handover procedure can include, for example, reception of a measurement report from the terminal apparatus 30, handover determination, transmission of an RRC connection reconfiguration message, and reception of an RRC connection reconfiguration complete message.

Subsequently, the processing returns to step S231, and the above-described processing is repeated until there remains no terminal apparatus 30 which utilizes the second radio communication service.

(2) Second Scenario

FIG. 7B is a flowchart illustrating an example of flow of the second scenario of communication control processing executed by the small cell base station 20 according to the first embodiment.

First, the operation mode setting unit 244 waits for reception of a control message from the macro cell base station 10 (step S250). When the control message giving an instruction to change the number of CCs is received by the network communication unit 220 from the macro cell base station 10, the processing proceeds to step S255.

The processing thereafter branches depending on whether an instruction to reduce the number of CCs is issued or an instruction to increase the number of CCs is issued (step S255). When an instruction to reduce the number of CCs is issued, the communication control unit 242 stepwisely reduces transmission power of a reference signal to be transmitted in a CC to be removed (step S260). The operation mode setting unit 244 then makes the operation mode of the small cell base station 20 transition from the high aggregation mode to the low aggregation mode, or transition from the low aggregation mode to the idle mode by removing the CC (step S265).

When an instruction to increase the number of CCs is issued, the operation mode setting unit 244 makes the operation mode of the small cell base station 20 transition from the low aggregation mode to the high aggregation mode or transition from the idle mode to the low aggregation mode by adding a new CC (step S270).

It should be noted that change of the number of CCs in step S265 and step S270 is, for example, signaled through transmission of the RRC connection reconfiguration message from the communication control unit 242 to the terminal apparatus 30. The RRC connection reconfiguration message can include system information relating to a component carrier to be removed or to be added.

Figure 8B:
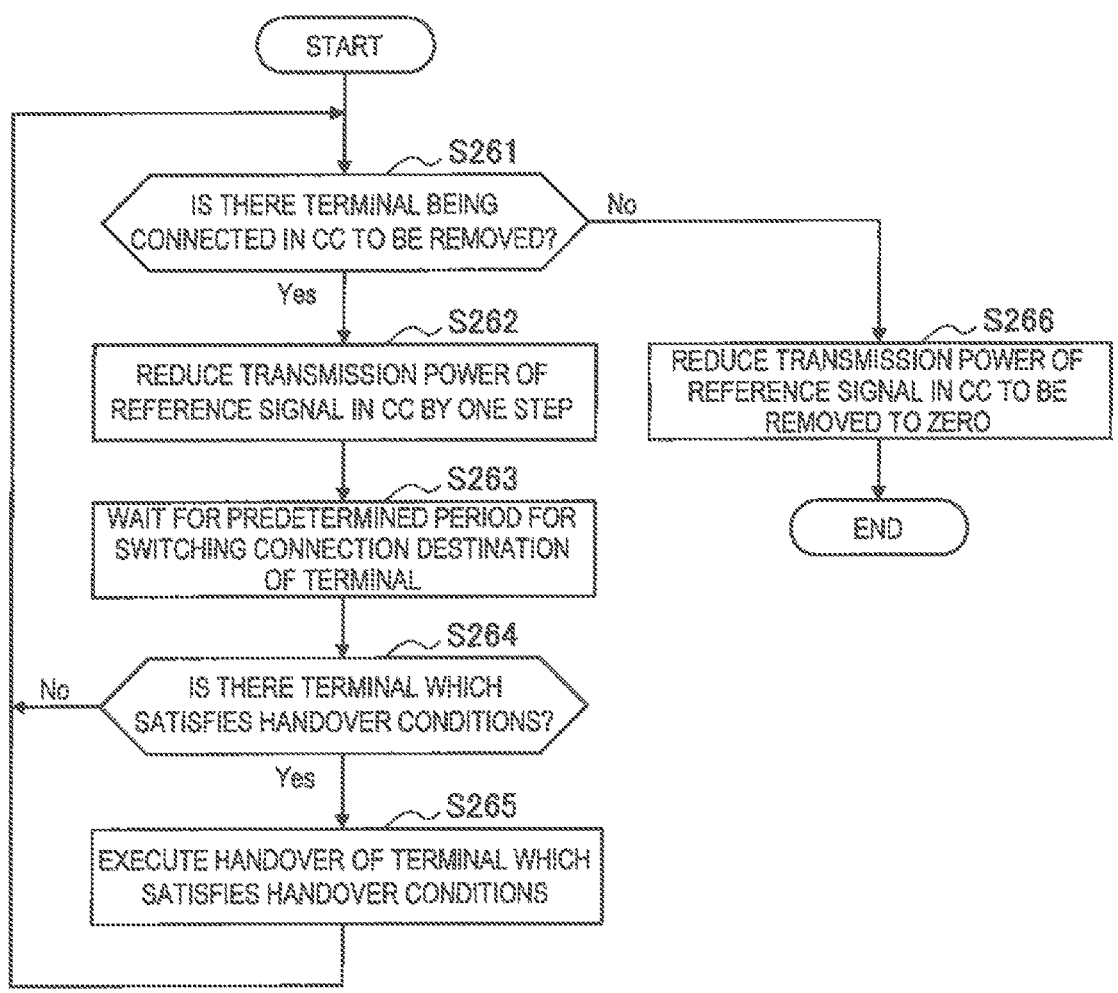
FIG. 8B is a flowchart illustrating an example of detailed flow of processing for transition to an operation mode in which power is less consumed in the second scenario.

FIG. 8B is a flowchart illustrating an example of detailed flow of processing corresponding to step S260 in FIG. 7B.

Referring to FIG. 8B, first, the communication control unit 242 determines whether there is a terminal apparatus 30 connected to a CC to be removed in the small cell 21 (step S261). Here, when there is no terminal apparatus 30 connected to a CC to be removed, the communication control unit 242 reduces transmission power of a reference signal to be transmitted in the CC to 0 (step S266).

When there is a terminal apparatus 30 connected to the CC to be removed, the communication control unit 242 reduces transmission power of a reference signal to be transmitted in the CC by one step (step S262). The communication control unit 242 then stands by over a predetermined period to switch the connection destination of the terminal apparatus 30 (step S263). During this period, the terminal apparatus 30 can execute cell selection or cell reselection. Further, when a terminal apparatus 30 which satisfies handover conditions occurs as a result of reduction of the transmission power (step S264), the communication control unit 242 executes handover between CCs or handover to a target base station in collaboration with the terminal apparatus 30 (step S265).

Subsequently, the processing returns to step S261, and the above-described processing is repeated until there remains no terminal apparatus 30 which is connected to the CC to be removed.

3. Second Embodiment

In the second embodiment described in this section, the macro cell base station 10 provides an index regarding the load of the first radio communication service to the small cell base station 20, and the small cell base station 20 determines necessity of change of the operation mode.

3-1. Configuration Example of Macro Cell Base Station

FIG. 9 is a block diagram illustrating an example of a configuration of the macro cell base station 10 according to the second embodiment. Referring to FIG. 9, the macro cell base station 10 includes a radio communication unit 110, a network communication unit 120, a storage unit 130 and a control unit 160.

The control unit 160 controls the whole operation of the macro cell base station 10 using a processor such as a CPU and a DSP. In the present embodiment, the control unit 160 includes a communication control unit 162 and an information managing unit 166.

(1) Communication Control Unit

The communication control unit 162 controls provision of the first radio communication service. For example, the communication control unit 162 transfers uplink data traffic received by the radio communication unit 110 from the network communication unit 120 to the core network 5 or another macro cell base station or the small cell base station 20 according to the address. Further, the communication control unit 162 transmits downlink data traffic received from other nodes by the network communication unit 120 from the radio communication unit 110 to the terminal apparatus 30 to which the downlink data traffic is addressed. Further, the communication control unit 162 performs control so that the radio communication unit 110 receives a report (for example, a measurement report or a CQI) indicating downlink communication quality measured by the terminal apparatus 30. Further, the communication control unit 162 performs control so that the radio communication unit 110 measures uplink communication quality.

(2) Information Managing Unit

The information managing unit 166 manages information to be provided from the macro cell base station 10 to one or more small cell base stations 20. For example, the information managing unit 166 generates information regarding the load of the first radio communication service to be provided by the macro cell base station 10 and transmits a control message indicating the generated information to the small cell base station 20 via the network communication unit 120 and the backhaul link. Here, three methods for generating the information regarding the load of the first radio communication service will be described using FIG. 10A to FIG. 10C.

(2-1) First Method

Figure 10A:
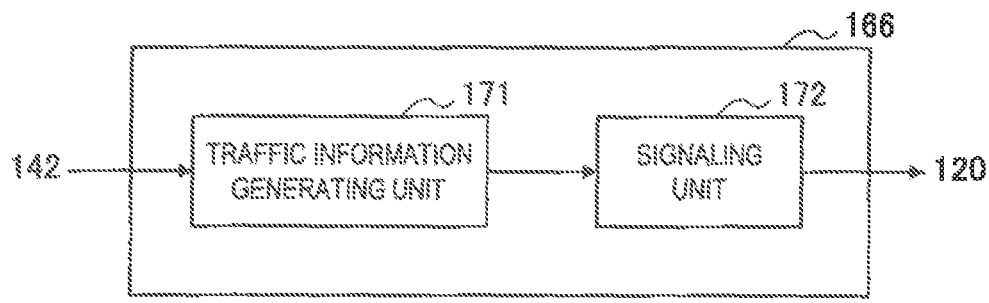
FIG. 10A is a block diagram illustrating a first example of a detailed configuration of an information managing unit illustrated in FIG. 9.

FIG. 10A is a block diagram illustrating a first example of a detailed configuration of the information managing unit 166 illustrated in FIG. 9. Referring to FIG. 10A, the information managing unit 166 has a traffic information generating unit 171 and a signaling unit 172.

The traffic information generating unit 171 calculates an amount of uplink traffic and downlink traffic to be processed by the radio communication unit 110 for each time window. A length of the time window may be defined in advance, for example, in terms of a slot, a subframe or a radio frame. The calculated traffic amount may be a total value of the traffic amount, a time average, a moving average or a maximum value in each time window. The traffic information generating unit 171 typically normalizes the latest calculation result of the traffic amount with a maximum value corresponding to the capacity of the macro cell 11 and outputs an index indicating the normalized traffic amount to the signaling unit 172.

The signaling unit 172 executes signaling with the small cell base station 20. For example, when the index indicating the traffic amount is inputted from the traffic information generating unit 171, the signaling unit 172 generates a control message indicating the index and transmits the generated control message to the small cell base station 20. The control message may be transmitted in response to a request from the small cell base station 20.

(2-2) Second Method

Figure 10B:
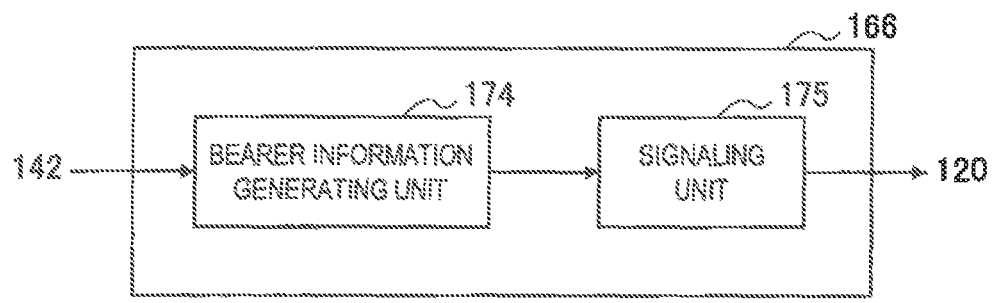
FIG. 10B is a block diagram illustrating a second example of a detailed configuration of an information managing unit illustrated in FIG. 9.

FIG. 10B is a block diagram illustrating a second example of the detailed configuration of the information managing unit 166 illustrated in FIG. 9. Referring to FIG. 10B, the information managing unit 166 has a bearer information generating unit 174 and a signaling unit 175.

The bearer information generating unit 174 calculates the number of active radio bearers established by the radio communication unit 110 for each time window. A length of the time window may be defined in advance, for example, in terms of a slot, a subframe or a radio flame. The calculated number of bearers may be a time average, a moving average or a maximum value in each time window. The bearer information generating unit 174 typically normalizes the latest calculation result of the number of radio bearers with a maximum value corresponding to the capacity of the macro cell 11 and outputs an index indicating the normalized number of bearers to the signaling unit 175. It should be noted that it is also possible to use the number of terminals being connected in place of the number of radio bearers.

The signaling unit 175 executes signaling with the small cell base station 20. For example, when the index indicating the number of radio bearers is inputted from the bearer information generating unit 174, the signaling unit 175 generates a control message indicating the index and transmits the generated control message to the small cell base station 20. The control message may be transmitted in response to a request from the small cell base station 20.

(2-3) Third Method

Figure 10C:
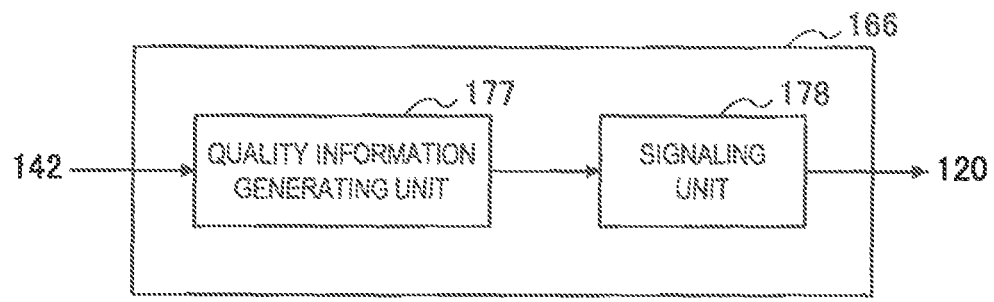
FIG. 10C is a block diagram illustrating a third example of a detailed configuration of an information managing unit illustrated in FIG. 9.

FIG. 10C is a block diagram illustrating a third example of the detailed configuration of the information managing unit 166 illustrated in FIG. 9. Referring to FIG. 10C, the information managing unit 166 has a quality information generating unit 177 and a signaling unit 178.

The quality information generating unit 177 acquires a measurement result of communication quality measured in the first radio communication service from the radio communication unit 110. For example, the measurement result of the communication quality acquired by the quality information generating unit 177 may be a CQI. The quality information generating unit 177 calculates the communication quality indicated by the CQI reported from the terminal for each time window. A length of the time window may be defined in advance, for example, in terms of a slot, a subframe or a radio frame. The calculated communication quality may be an average value in each time window. The quality information generating unit 177 then outputs an index indicating the calculated communication quality or the acquired CQI itself to the signaling unit 178.

The signaling unit 178 executes signaling with the small cell base station 20. For example, when the index indicating the communication quality is inputted from the bearer information generating unit 177, the signaling unit 178 generates a control message indicating the index and transmits the generated control message to the small cell base station 20. The control message may be transmitted in response to a request from the small cell base station 20.

In any example of FIG. 10A to FIG. 10C, the index regarding the load of the first radio communication service provided to the small cell base station 20 can be used by the small cell base station 20 to control the operation mode of the small cell base station 20. Also in the present embodiment, the small cell base station 20 may be able to operate in the operation modes as described using FIG. 4A to FIG. 4D or in other arbitrary operation modes.

3-2. Configuration Example of Small Cell Base Station

Figure 11:
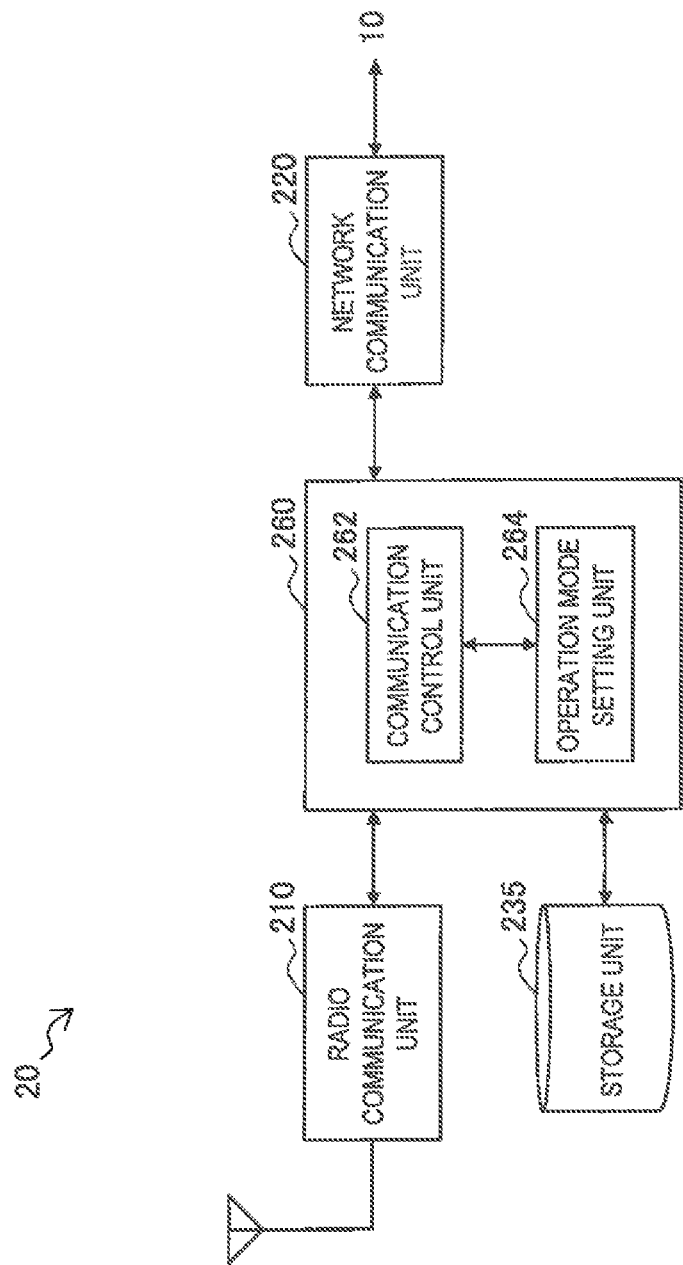
FIG. 11 is a block diagram illustrating an example of a configuration of a small cell base station according to the second embodiment.

FIG. 11 is a block diagram illustrating an example of a configuration of the small cell base station 20 according to the second embodiment. Referring to FIG. 11, the small cell base station 20 includes a radio communication unit 210, a network communication unit 220, a storage unit 235 and a control unit 260.

(1) Storage Unit

The storage unit 235 stores a program and data for operation of the small cell base station 20 using a storage medium such as a hard disc and a semiconductor memory.

The data stored in the storage unit 235 can include, for example, the index of the load of the first radio communication service received from the macro cell base station 10 and a set of thresholds to be compared with the load.

(2) Control Unit

The control unit 260 controls the whole operation of the small cell base station 20 using a processor such as a CPU and a DSP. In the present embodiment, the control unit 260 includes a communication control unit 262 and an operation mode setting unit 264.

(2-1) Communication Control Unit

The communication control unit 262 controls provision of the second radio communication service. For example, the communication control unit 262 performs control so that uplink data traffic received by the radio communication unit 210 is transferred from the network communication unit 220 to the macro cell base station 10 according to the address. Further, the communication control unit 262 performs control so that downlink data traffic received from other nodes by the network communication unit 220 is transmitted from the radio communication unit 210 to the terminal apparatus 30 to which the downlink data traffic is addressed. Further, the communication control unit 262 performs control so that the radio communication unit 210 receives a report (for example, a measurement report or a CQI report) indicating downlink communication quality measured by the terminal apparatus 30. Further, the communication control unit 262 performs control so that the radio communication unit 210 measures uplink communication quality.

(2-2) Operation Mode Setting Unit

The operation mode setting unit 264 sets an operation mode which can be selected from a set of the operation modes illustrated in FIG. 4A to FIG. 4D at the small cell base station 20. In the present embodiment, the operation mode setting unit 264 makes the operation mode of the small cell base station 20 transition based on the index regarding the load of the first radio communication service indicated by the control message received from the macro cell base station 10. Here, three methods for making the operation mode transition based on the index regarding the load of the first radio communication service will be described using FIG. 12A to FIG. 12C.

(2-2-1) First Method

Figure 12A:
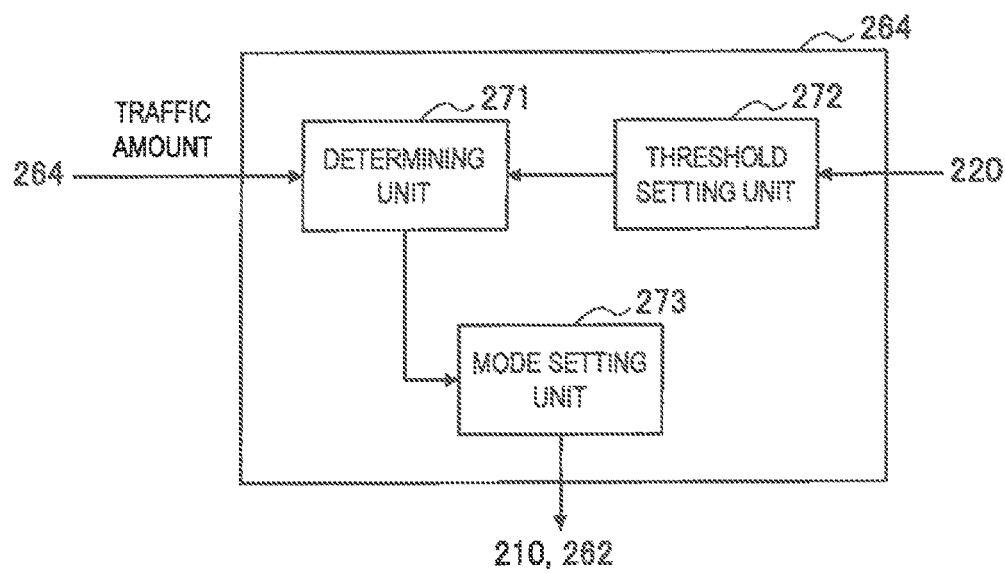
FIG. 12A is a block diagram illustrating a first example of a detailed configuration of an operation mode setting unit illustrated in FIG. 11.

FIG. 12A is a block diagram illustrating a first example of a detailed configuration of the operation mode setting unit 264 illustrated in FIG. 11. Referring to FIG. 12A, the operation mode setting unit 264 has a determining unit 271, a threshold setting unit 272 and a mode setting unit 273. In the first example, the load of the first radio communication service is determined based on the traffic amount of the first radio communication service.

The determining unit 271 acquires the index indicating the traffic amount included in the control message received from the macro cell base station 10. The determining unit 271 then determines whether determination conditions for making the operation mode of the small cell base station 20 transition are satisfied by comparing the traffic amount indicated by the acquired index with the threshold set by the threshold setting unit 272. For example, the determining unit 271 can determine whether the latest traffic amount of the macro cell 11 falls below a first threshold to determine whether to make the operation mode of the small cell base station 20 transition to the second mode in which power is less consumed in the case where the small cell base station 20 operates in the first mode. When the latest traffic amount falls below the first threshold, because the load of the first radio communication service is sufficiently low, it is possible to reduce power consumption of the whole system by making the operation mode of the small cell base station 20 transition to the second mode. Further, the determining unit 271 can determine whether the latest traffic amount of the macro cell 11 exceeds a second threshold to determine whether to make the operation mode of the small cell base station 20 transition to the first mode in the case where the small cell base station 20 operates in the second mode. When the latest traffic amount exceeds the second threshold, because the load of the first radio communication service is considerably high, it is possible to distribute the load by making the operation mode of the small cell base station 20 transition to the first mode. When determining that the determination conditions are satisfied, the determination unit 271 outputs the determination result to the mode setting unit 273.

The threshold setting unit 272 sets a threshold constituting the determination conditions for determining the load of the first radio communication service at the determining unit 271. The threshold setting unit 272 may set a fixed threshold. Alternatively, the threshold setting unit 272, for example, may set a threshold designated by a control message received from other nodes (for example, a macro cell base station 10 or a control node within the core network 5) via the network communication unit 220 at the determining unit 271. When the traffic amount is normalized as described above, a threshold to be compared with the normalized traffic amount falls within a range from 0 to 1. A first threshold to be compared with the traffic amount of the first radio communication service for switching from the first mode (for example, the active mode) to the second mode (for example, the idle mode) may be a value lower than a second threshold for switching from the second mode to the first mode. With such hysteresis control, it is possible to avoid a risk that the operation mode is excessively frequently switched between the two modes when the value of the traffic amount is close to the threshold.

The mode setting unit 273 makes the operation mode of the small cell base station 20 transition according to the determination result for the transition of the operation mode inputted from the determining unit 271. When the mode setting unit 273 makes the operation mode of the radio communication unit 210 transition from a first mode to a second mode in which power is less consumed than in the first mode, the communication control unit 262 stepwisely reduces transmission power of a reference signal to be transmitted from the radio communication unit 210. When the second mode is a low aggregation mode as described using FIG. 4C, the reference signal described here may be a reference signal of a component carrier to be removed. The communication control unit 262 then stands by over a predetermined time period every time the transmission power of the reference signal is reduced by one step. A duration of the standby period here may be, for example, a duration corresponding to a transmission cycle corresponding to several times of transmission of the reference signal. During this standby period, the terminal apparatus 30 connected to the second radio communication service executes handover, cell selection or cell reselection to switch a connection destination from the small cell base station 20 to another base station (or from a component carrier to be removed to another component carrier). The communication control unit 262 confirms the number of the terminal apparatuses 30 which utilize the second radio communication service while stepwisely reducing transmission power of the reference signal, and, after the number of the terminal apparatuses 30 becomes 0, the communication control unit 242 switches the operation mode of the radio communication unit 210 to the second mode.

(2-2-2) Second Method

Figure 12B:
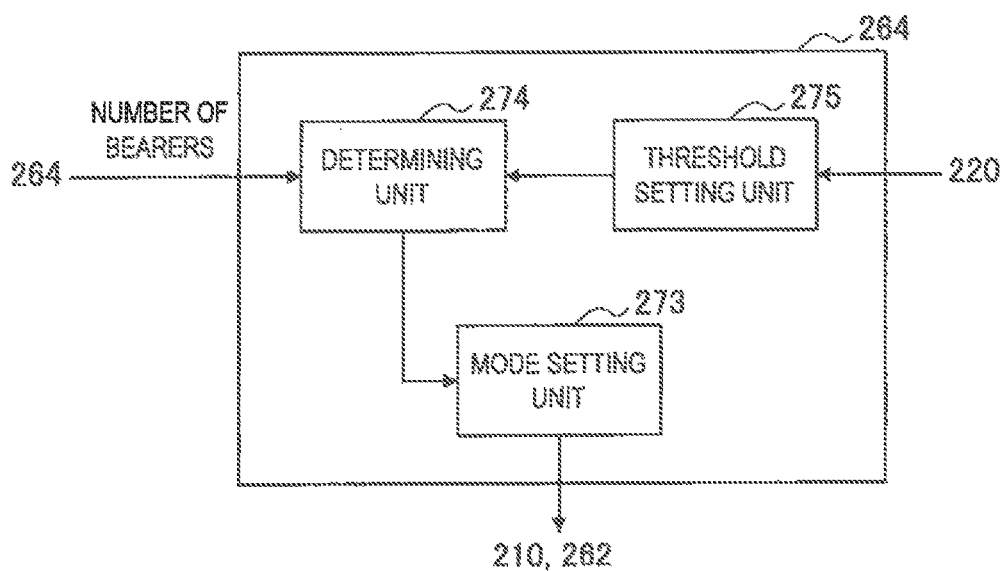
FIG. 12B is a block diagram illustrating a second example of a detailed configuration of an operation mode setting unit illustrated in FIG. 11.

FIG. 12B is a block diagram illustrating a second example of the detailed configuration of the operation mode setting unit 264 illustrated in FIG. 11. Referring to FIG. 12B, the operation mode setting unit 264 has a determining unit 274, a threshold setting unit 275 and a mode setting unit 273. In the second example, the load of the first radio communication service is determined based on the number of radio bearers in the first radio communication service. It should be noted that it is also possible to use the number of terminals being connected in place of the number of radio bearers.

The determining unit 274 acquires an index indicating the number of bearers included in the control message received from the macro cell base station 10. Subsequently, the determining unit 274 determines whether the determination conditions for transition of the operation mode of the small cell base station 20 by comparing the number of radio bearers indicated by the acquired index with the threshold set by the threshold setting unit 275. For example, the determining unit 274 can determine whether the latest number of radio bearers of the macro cell 11 falls below a first threshold to determine whether to make the operation mode of the small cell base station 20 transition to the second mode in which power is less consumed in the case where the small cell base station 20 operates in the first mode. When the latest number of radio bearers falls below the first threshold, because the load of the first radio communication service is sufficiently low, it is possible to reduce power consumption of the whole system by making the operation mode of the small cell base station 20 transition to the second mode. Further, the determining unit 274 can determine whether the latest number of radio bearers of the macro cell 11 exceeds a second threshold to determine whether to make the operation mode of the small cell base station 20 transition to the first mode in the case where the small cell base station 20 operates in the second mode. When the latest number of radio bearers exceeds the second threshold, because the load of the first radio communication service is considerably high, it is possible to distribute the load by making the operation mode of the small cell base station 20 transition to the first mode. When determining that the determination conditions are satisfied, the determination unit 274 outputs the determination result to the mode setting unit 273.

The threshold setting unit 275 sets a threshold constituting determination conditions for determining the load of the first radio communication service at the determining unit 274. The threshold setting unit 275 may set a fixed threshold. Alternatively, the threshold setting unit 275, for example, may set a threshold designated by a control message received from other nodes via the network communication unit 220 at the determining unit 274. When the number of radio bearers is normalized as described above, a threshold to be compared with the normalized number of radio bearers falls within a range from 0 to 1. A first threshold to be compared with the number of radio bearers of the first radio communication service for switching from the first mode (for example, the active mode) to the second mode (for example, the idle mode) may be a value lower than a second threshold for switching from the second mode to the first mode.

(2-2-3) Third Method

Figure 12C:
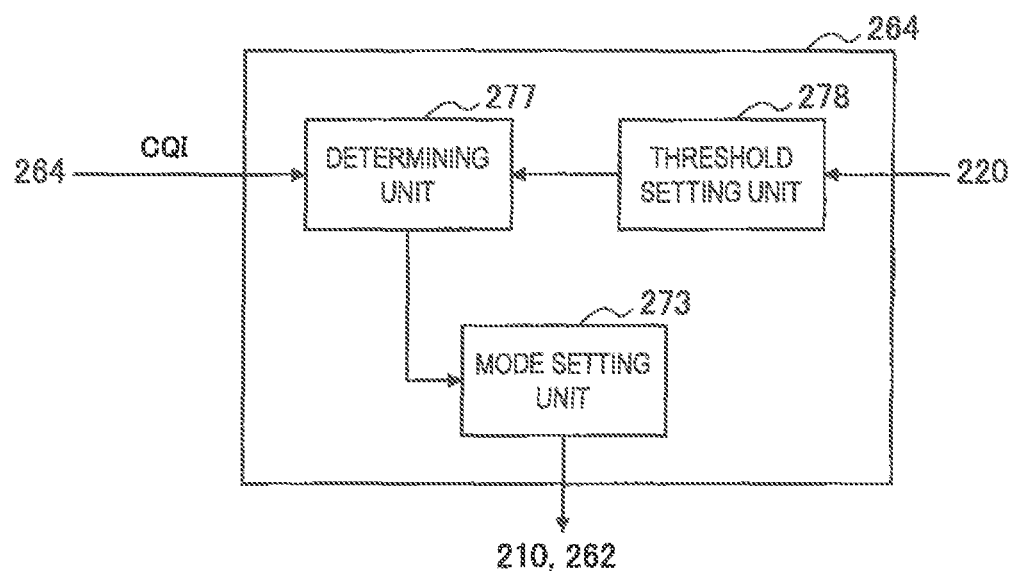
FIG. 12C is a block diagram illustrating a third example of a detailed configuration of an operation mode setting unit illustrated in FIG. 11.

FIG. 12C is a block diagram illustrating a third example of the detailed configuration of the operation mode setting unit 264 illustrated in FIG. 11. Referring to FIG. 12C, the operation mode setting unit 264 has a determining unit 277, a threshold setting unit 278 and a mode setting unit 273. In the third example, the load of the first radio communication service is determined based on the communication quality measured in the first radio communication service.

The determining unit 277 acquires an index indicating the communication quality included in the control message received from the macro cell base station 10. The determining unit 277 then determines whether determination conditions for making the operation mode of the small cell base station 20 transition are satisfied by comparing the communication quality indicated by the acquired index with the threshold set by the threshold setting unit 278. For example, when the small cell base station 20 operates in the first mode, the determining unit 277 can determine whether the communication quality of the first radio communication service exceeds a predetermined threshold to determine whether to make the operation mode of the small cell base station 20 transition to the second mode in which power is less consumed. The determining unit 277 may compare the number or a ratio of terminals which experience poor communication quality with the threshold. When the determination conditions based on the communication quality are satisfied, the determining unit 277 can determine that the operation mode of the small cell base station 20 should be made to transition to the second mode. Meanwhile, when the small cell base station 20 operates in the second mode, the determining unit 277 can determine that the operation mode of the small cell base station 20 should be made to transition to the first mode when the communication quality of the first radio communication service falls below a predetermined threshold, or when the number or a ratio of terminals which experience poor communication quality exceeds a predetermined threshold. When determining that the determination conditions are satisfied, the determining unit 277 outputs the determination result to the mode setting unit 273.

The threshold setting unit 278 sets a threshold constituting determination conditions for determining the load of the first radio communication service at the determining unit 277. The threshold setting unit 278 may set a fixed threshold. Alternatively, the threshold setting unit 278, for example, may set a threshold designated by a control message received from other nodes via the network communication unit 220 at the determining unit 277.

According to a configuration in which the small cell base station 20 voluntarily determines whether to make the operation mode of the small cell base station 20 transition as in the present embodiment, it is possible to flexibly control the operation mode according to the requirements of individual small cell base stations 20. Further, because it is not necessary to implement a logic for conditions determination for transition of the operation mode at the macro cell base station 10, it is possible to introduce the above-described mechanism to the radio communication system 1 while minimizing impact on the existing system.

It should be noted that, also in the present embodiment, regardless of the load of the first radio communication service, when it is determined that the communication quality measured for the second radio communication service within the small cell 21 can be further reduced, the communication control unit 262 may reduce the transmission power of the reference signal to be transmitted from the radio communication unit 210 without making the operation mode transition.

3-3. Configuration Example of Terminal Apparatus

The configuration of the terminal apparatus 30 in the present embodiment may be the same as the configuration of the terminal apparatus 30 described in association with the first embodiment. That is, also in the present embodiment, during process in which the operation mode of the small cell base station 20 transitions from the first mode to the second mode in which power is less consumed than in the first mode, the transmission power of the reference signal received by the terminal apparatus 30 is reduced stepwisely. The terminal apparatus 30 switches the connection destination of the radio communication unit from the small cell base station 20 which is a current serving base station to another base station (or switches a primary CC to another CC) at a timing during the process. During such procedure, the terminal apparatus 30 neither loses a packet, nor is put into a state where communication is impossible.

3-4. Processing Flow (Macro Cell Base Station)

In this section, an example of flow of processing executed by the macro cell base station 10 in the second embodiment will be described. The processing executed by the macro cell base station 10 does not depend on types of the operation modes in which the small cell base station 20 can operate.

Figure 13:
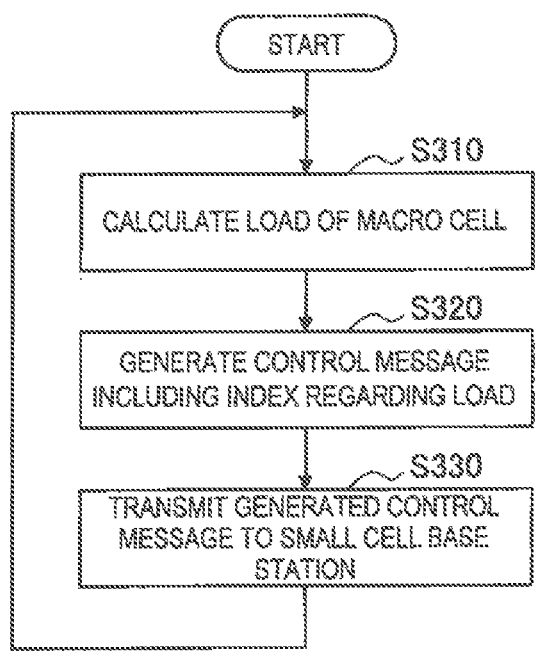
FIG. 13 is a flowchart illustrating an example of flow of communication control processing executed by the macro cell base station according to the second embodiment.

FIG. 13 is a flowchart illustrating an example of flow of communication control processing executed by the macro cell base station according to the second embodiment.

First, the information managing unit 166 calculates the latest load of the first radio communication service provided in the macro cell 11 (step S310). The load of the first radio communication service may be calculated in terms of any of a traffic amount, the number of radio bearers, the number of terminals being connected and communication quality.

Next, the information managing unit 166 generates a control message including an index regarding the load of the first radio communication service (step S320).

The information managing unit 166 then transmits the generated control message to the small cell base station 20 via the network communication unit 120 and the backhaul link (step S330).

Subsequently, the processing returns to step S310, and the above-described processing can be repeated in a fixed cycle. It should be noted that the processing illustrated in FIG. 13 may be at least partially executed in response to a request received from the small cell base station 20.

3-5. Processing Flow (Small Cell Base Station)

In this section, an example of processing flow executed by the small cell base station 20 in the second embodiment will be described. In first scenario, the small cell base station 20 can operate in the active mode and the idle mode. In second scenario, the small cell base station 20 can operate in the high aggregation mode, the low aggregation mode, and the idle mode.

(1) First Scenario

Figure 14A:
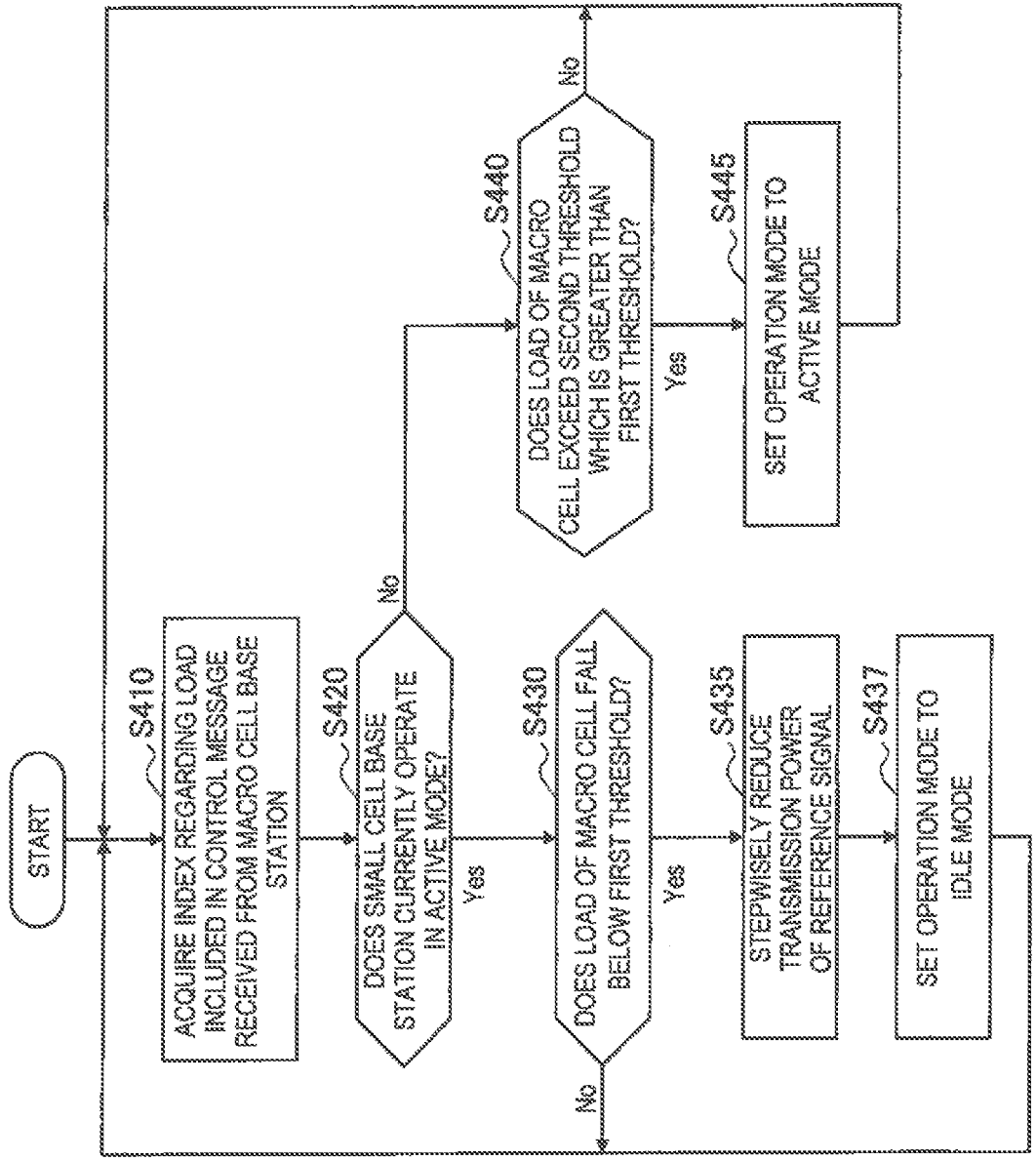
FIG. 14A is a flowchart illustrating an example of flow in first scenario of communication control processing executed by the small cell base station according to the second embodiment.

FIG. 14A is a flowchart illustrating an example of flow in the first scenario of communication control processing executed by the small cell base station 20 according to the second embodiment.

First, the operation mode setting unit 264 acquires an index regarding the latest load of the first radio communication service provided in the macro cell 11 from the control message received from the macro cell base station 10 (step S410). The load of the first radio communication service may be determined in terms of any of a traffic amount, the number of radio bearers, the number of terminals being connected and communication quality.

The processing thereafter branches depending on whether the small cell base station 20 currently operates in the active mode or in the idle mode (step S420). When the small cell base station 20 currently operates in the active mode, the operation mode setting unit 264 compares the load of the macro cell 11 indicated by the index acquired in step S410 with a first threshold (step S430). When the load of the macro cell 11 falls below the first threshold, the communication control unit 262 stepwisely reduces transmission power of a reference signal to be transmitted from the radio communication unit 210 (step S435). Here, the transmission power may be reduced stepwisely as described using FIG. 8A. The operation mode setting unit 264 then sets the operation mode of the small cell base station 20 to the idle mode (step S437).

When the small cell base station 20 currently operates in the idle mode, the operation mode setting unit 264 compares the load of the macro cell 11 calculated in step S410 with a second threshold which is greater than the first threshold (step S440). When the load of the macro cell 11 exceeds the second threshold, the operation mode setting unit 264 sets the operation mode of the small cell base station 20 to the active mode (step S445).

(2) Second Scenario

Figure 14B:
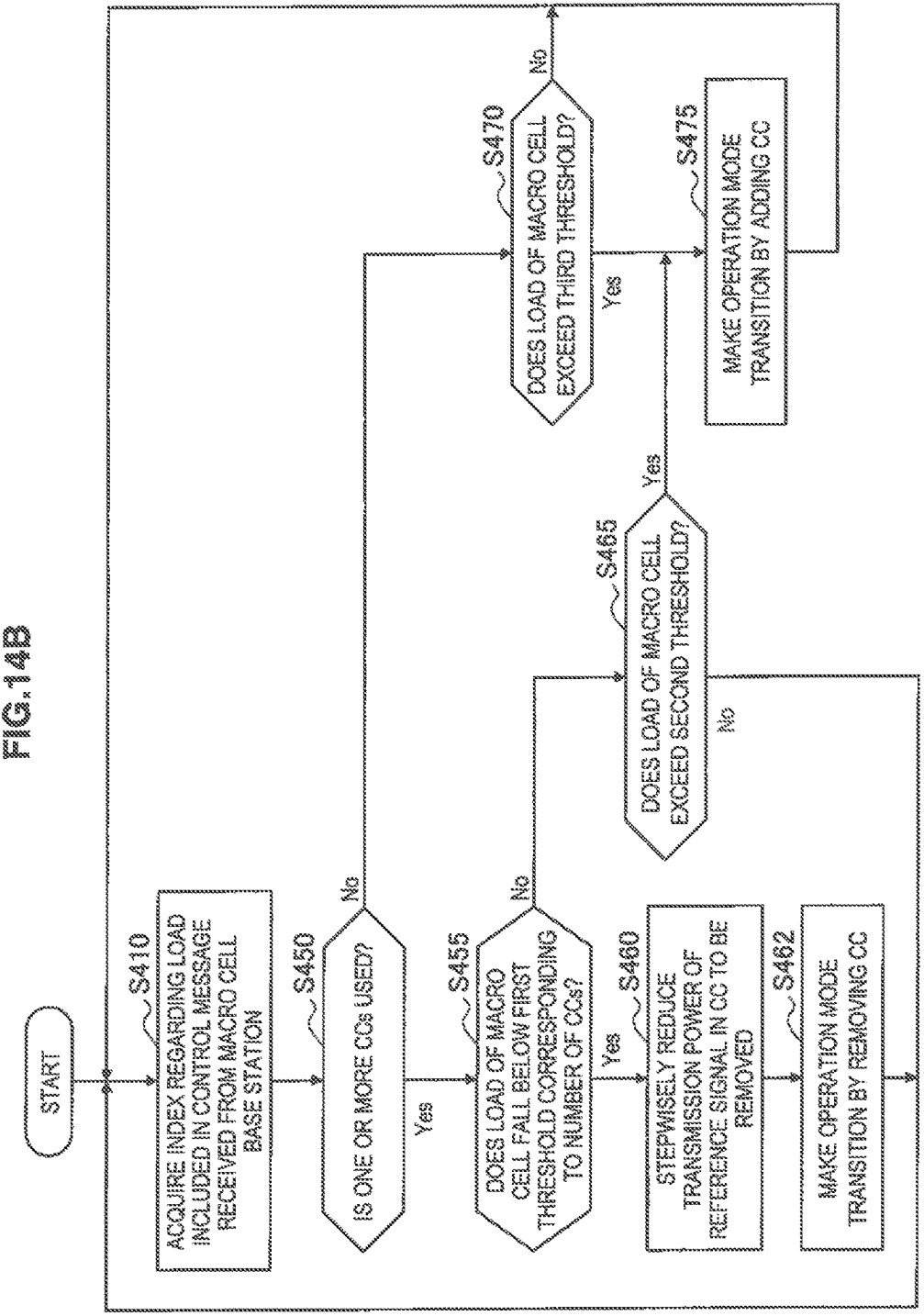
FIG. 14B is a flowchart illustrating an example of flow in second scenario of communication control processing executed by the small cell base station according to the second embodiment.

FIG. 14B is a flowchart illustrating an example of flow in the second scenario of communication control processing executed by the small cell base station 20 according to the second embodiment.

First, the operation mode setting unit 264 acquires an index regarding the latest load of the first radio communication service provided in the macro cell 11 from the control message received from the macro cell base station 10 (step S410). The load of the first radio communication service may be determined in terms of any of a traffic amount, the number of radio bearers, the number of terminals being connected and communication quality.

The processing thereafter branches depending on whether the small cell base station 20 currently uses one or more component carriers (step S450). When the small cell base station 20 currently uses one or more component carriers, the operation mode setting unit 264 compares the load of the macro cell 11 indicated by the index acquired in step S410 with a first threshold corresponding to the number of CCs at that time (step S455). When the load of the macro cell 11 falls below the first threshold, the communication control unit 262 stepwisely reduces the transmission power of the reference signal to be transmitted in a CC to be removed (step S460). Here, the transmission power may be reduced stepwisely as described using FIG. 8B. The operation mode setting unit 264 then makes the operation mode of the small cell base station 20 transition from the high aggregation mode to the low aggregation mode or transition from the low aggregation mode to the idle mode by removing the CC (step S462). It should be noted that a determination threshold for the former transition may be different from a determination threshold for the latter transition.

When the load of the macro cell 11 does not fall below the first threshold, the operation mode setting unit 264 compares the load of the macro cell 11 with a second threshold which is greater than the first threshold (step S465). When the load of the macro cell 11 exceeds the second threshold, the operation mode setting unit 264 makes the operation mode of the small cell base station 20 transition from the low aggregation mode to the high aggregation mode by adding a new CC (step S475). It should be noted that when the small cell base station 20 has already operated in the high aggregation mode, determination in step S465 may be skipped.

When the small cell base station 20 currently operates in the idle mode, the small cell base station 20 does not use any CC. In this case, the operation mode setting unit 264 compares the load of the macro cell 11 with a third threshold (step S470). When the load of the macro cell 11 exceeds the third threshold, the operation mode setting unit 264 makes the operation mode of the small cell base station 20 transition from the idle mode to the low aggregation mode or the high aggregation mode by adding a new CC (step S475).

4. Application Example

The technique according to the present disclosure can be applied to various products. For example, the macro cell base station 10 and the small cell base station 20 can be implemented as evolved node B (eNB) of an LTE scheme or the LTE-A scheme. Alternatively, the macro cell base station 10 and the small cell base station 20 can be implemented as other types of base stations such as Node B or base transceiver station (BTS). The macro cell base station 10 may include a body (also referred to as a base station apparatus) which controls radio communication, and one or more remote radio heads (RRHs) disposed at positions different from the body. The small cell base station 20 may be implemented as a smaller-scale base station, radio access point or mobile outer.

For example, a terminal apparatus 30 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 30 may also be realized as a terminal (that is also referred to as a machine type communication (MTC) terminal) that performs machine-to-machine (M2M) communication. Furthermore, the terminal apparatus 30 may be a radio communication module (such as an integrated circuit module including a single die) mounted on each of the terminals.

4-1. Application Examples Regarding Base Station

First Application Example

Figure 15:
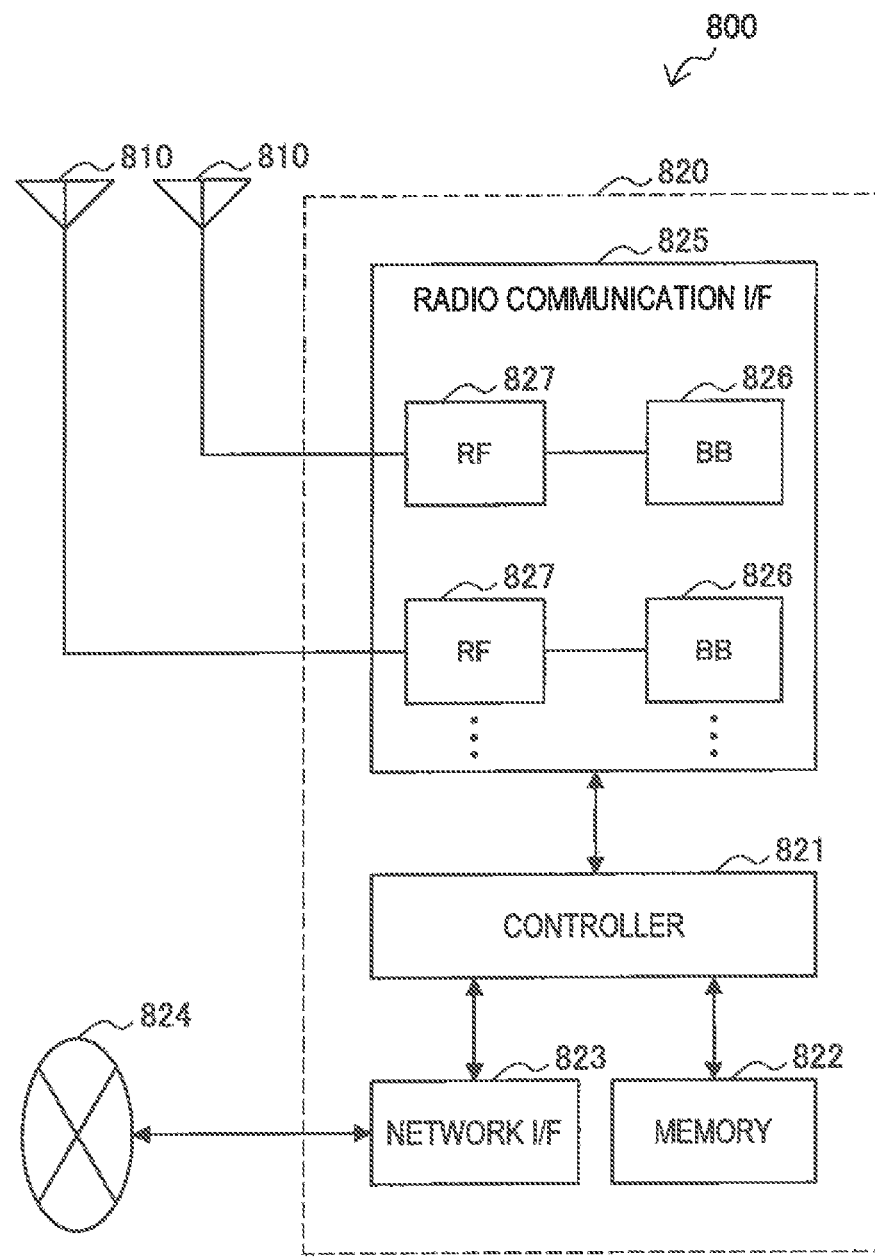
FIG. 15 is a block diagram illustrating a first example of a schematic configuration of an eNB.

FIG. 15 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 15. For example, the multiple antennas 810 may be compatible with multiple frequency bands used by the eNB 800. Although FIG. 15 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as LTE and LTE-A, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 15. For example, the multiple BB processors 826 may be compatible with multiple frequency bands used by the eNB 800. The radio communication interface 825 may include the multiple RF circuits 827, as illustrated in FIG. 15. For example, the multiple RF circuits 827 may be compatible with multiple antenna elements. Although FIG. 15 illustrates the example in which the radio communication interface 825 includes the multiple BB processors 826 and the multiple RP circuits 827, the radio communication interface 825 may also include a single BB processor 826 or a single RF circuit 827.

Second Application Example

Figure 16:
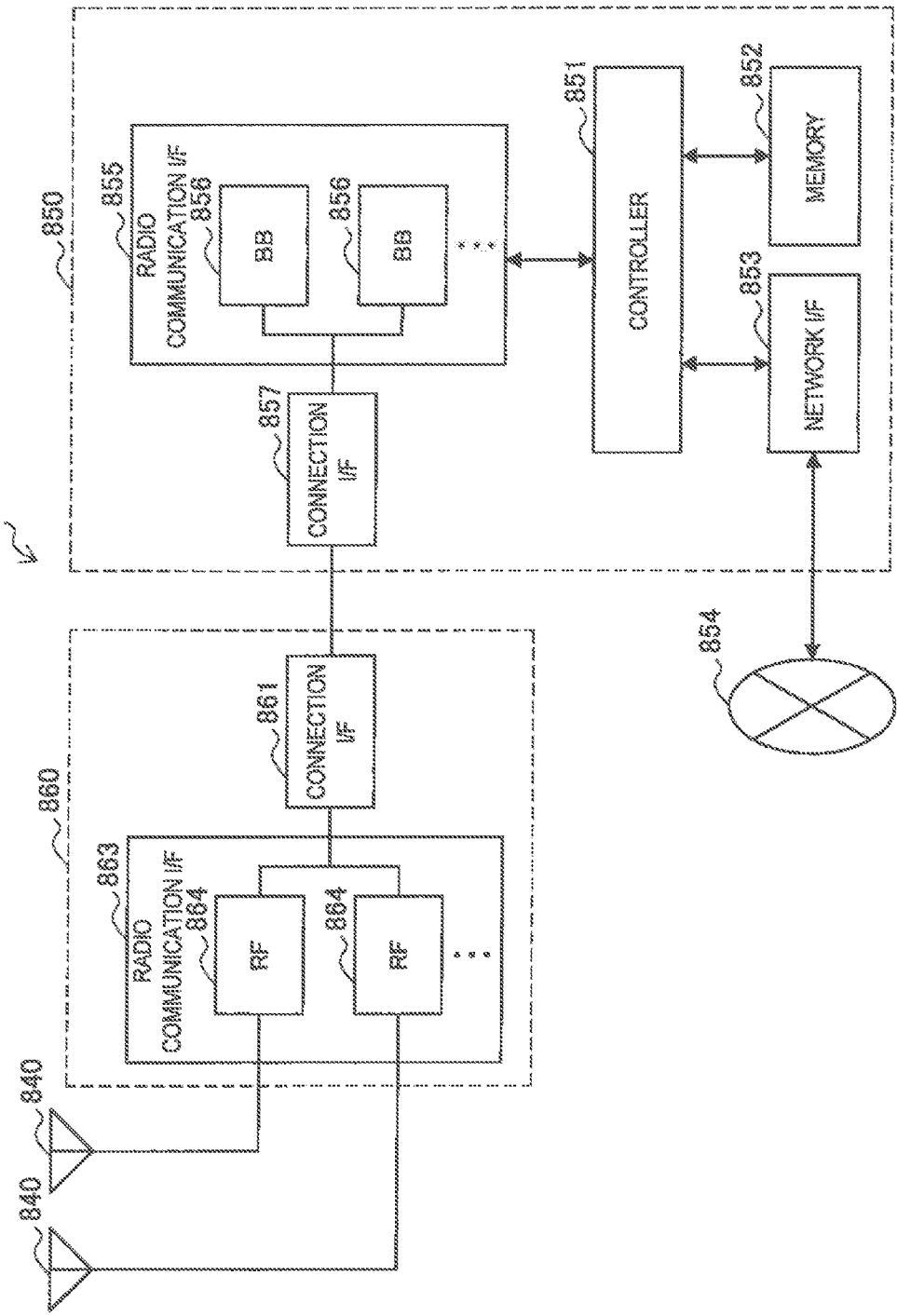
FIG. 16 is a block diagram illustrating a second example of a schematic configuration of an eNB.

FIG. 16 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 16. For example, the multiple antennas 840 may be compatible with multiple frequency bands used by the eNB 830. Although FIG. 16 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 15.

The radio communication interface 855 supports any cellular communication scheme such as LTE and LTE-A, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 15, except the BB processor 856 is connected to the RF circuit 864 of the RRH 860 via the connection interface 857. The radio communication interface 855 may include the multiple BB processors 856, as illustrated in FIG. 16. For example, the multiple BB processors 856 may be compatible with multiple frequency bands used by the eNB 830. Although FIG. 16 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 16. For example, the multiple RF circuits 864 may support multiple antenna elements. Although FIG. 16 illustrates the example in which the radio communication interface 863 includes the multiple RF circuits 864, the radio communication interface 863 may also include a single RF circuit 864.

In the eNB 800 and the eNB 830, the function relating to small cell control of the macro cell base station 10 described using FIG. 2 and FIG. 9 may be implemented in the radio communication interface 825, the radio communication interface 855 or the radio communication interface 863. Further, the function relating to small cell control of the macro cell base station 10 may be implemented in the controller 821 or the controller 851. For example, when the operation mode of the small cell disposed within a cell of the eNB 800 is made to transition to the idle mode, the controller 821 may stepwisely reduce the transmission power of the reference signal from the small cell. By this means, it is possible to actively reduce power consumption of the small cell without making the terminal located in the vicinity of the small cell unable to perform communication.

Further, in the eNB 800, the function relating to operation mode control of the small cell base station 20 described using FIG. 5 and FIG. 11 may be implemented in the radio communication interface 825 or may be implemented in the controller 821. For example, when the small cell base station is implemented as the eNB 800, the controller 821 may make the operation mode of the radio communication interface 825 transition to the idle mode after stepwisely reducing the transmission power of the reference signal from the eNB 800. By this means, it is possible to actively reduce power consumption of the eNB 800 without making the terminal located in the vicinity of the eNB 800 unable to perform communication.

4-2. Application Examples Regarding Terminal Apparatus

First Application Example

Figure 17:
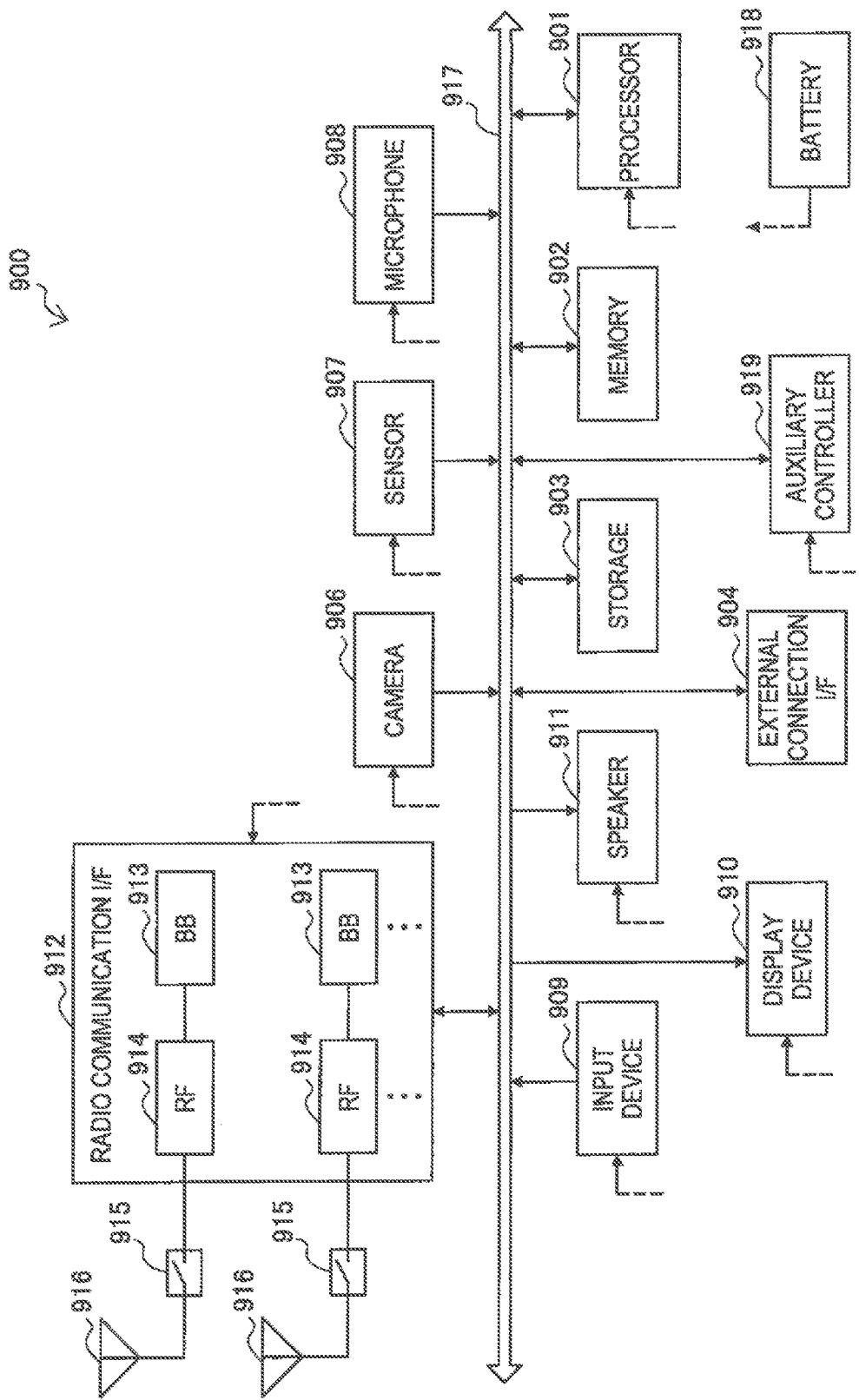
FIG. 17 is a block diagram illustrating an example of a schematic configuration of a smartphone.

FIG. 17 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user.

The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 17. Although FIG. 17 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 17. Although FIG. 17 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 17 via feeder lines, which are partially shown as dashed lines in the figure. The auxiliary controller 919 operates a minimum necessary function of the smartphone 900, for example, in a sleep mode.

The radio communication interface 912 of the smartphone 900 illustrated in FIG. 17 may have functions for executing the above-described cell selection, cell reselection and handover of the terminal apparatus 30. Further at least part of these functions may be implemented in the processor 901 or the auxiliary controller 919. For example, by the smartphone 900 performing handover to another base station while the transmission power of the reference signal from the small cell base station is reduced stepwisely, it is possible to make the operation mode of the small cell base station smoothly transition to the idle mode.

It should be noted that the smartphone 900 may operate as the small cell base station by the processor 901 executing an access point function. Further, the radio communication interface 913 may have a function as the small cell base station.

Second Application Example

Figure 18:
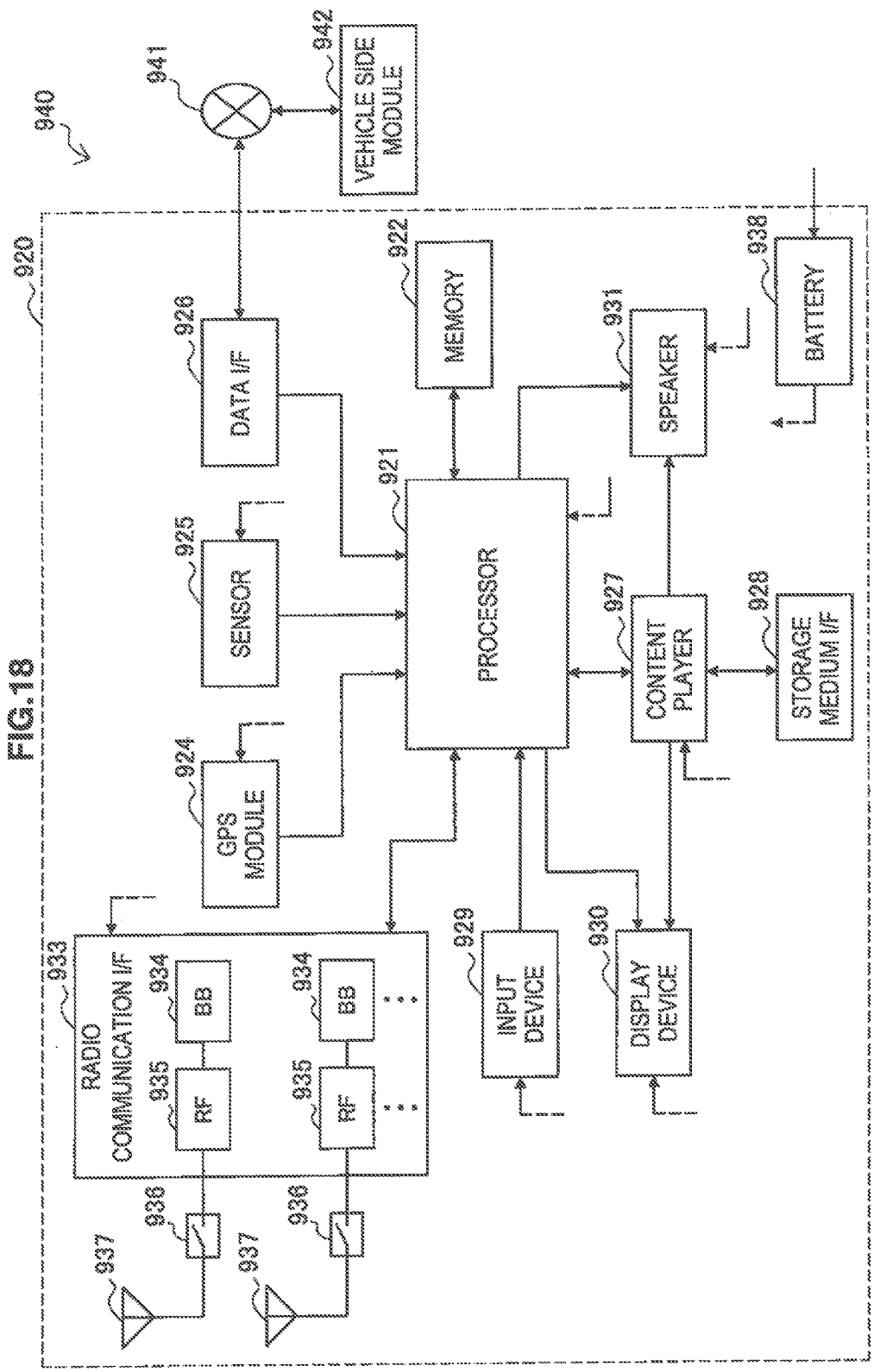
FIG. 18 is a block diagram illustrating an example of a schematic configuration of a car navigation apparatus.

FIG. 18 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-A, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 18. Although FIG. 18 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 18. Although FIG. 18 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 18 via feeder lines that are partially shown as dashed lines in the figure. The battery 938 accumulates power supplied form the vehicle.

The radio communication interface 933 of the car navigation apparatus 940 illustrated in FIG. 18 may have functions of executing the above-described cell selection, cell reselection and handover of the terminal apparatus 30. Further, at least part of these functions may be implemented in the processor 921. For example, by the car navigation apparatus 940 performing handover to another base station while the transmission power of the reference signal from the small cell base station is reduced stepwisely, it is possible to make the operation mode of the small cell base station smoothly transition to the idle mode.

Further, the technique according to the present disclosure may be implemented as a vehicle system (or a vehicle) 940 including one or more blocks of the above-described car navigation apparatus 920, the in-vehicle network 941 and a vehicle side module 942. The vehicle side module 942 generates vehicle side data such as vehicle speed, engine speed and failure information and outputs the generated data to the in-vehicle network 941.

5. Conclusion

Some embodiments of the technique according to the present disclosure have been described in detail above using FIG. 1 to FIG. 18. According to the above-described embodiments, in a situation where the second base station provides the second radio communication service within a cell where the first base station provides the first radio communication service, when the operation mode is made to transition from the first mode to the second mode in which power is less consumed than in the first mode, the second base station switches the operation mode to the second mode after stepwisely reducing the transmission power of the reference signal to be transmitted to the terminal apparatus. Therefore, the second base station can smoothly switch the operation mode to a mode in which power is less consumed without passively waiting until there remains no active terminal being connected to the second base station. That is, it is possible to realize further power saving in a heterogeneous network.

Further according to the above-described embodiments, the second base station stands by for a period required for the terminal apparatus connected to the second radio communication service to switch the connection destination, every time the transmission power is reduced by one step. That is, the terminal apparatus is provided with a period for executing handover, cell selection or cell reselection by evaluation the reduced reception power of the reference signal. By this means, it is possible to prevent the terminal apparatus connected to the second base station from being unable to perform communication due to transition of the operation mode of the second base station.

Further, according to the above-described embodiments, when the second base station operates in the first mode, and if it is determined that the load of the first radio communication service is low, the operation mode of the second base station is switched to the second mode. Therefore, it is possible to avoid a situation where the second base station (for example, the small cell base station) is made to operate in the first mode in which power is more consumed while the load of the first base station (for example, the macro cell base station) is not so high, which is not effcient in terms of power consumption of the whole system.

As an example, the first mode is the active mode in which the radio communication unit continuously operates, and the second mode is the idle mode or the sleep mode in which the radio communication unit at least intermittently operates. In this case, as a result of a period during which power is supplied to the radio communication unit of the second base station being reduced, power saving of the second base station or as the whole system is realized.

As another example, the first mode is a mode in which a plurality of component carriers for the second radio communication service are used, and the second mode is a mode in which component carriers fewer than the first mode are used. In this case, as a result of power consumed in the radio communication unit of the second base station being reduced, power saving of the second base station or as the whole system is realized.

Note that the series of control processing by the respective apparatuses described herein may be implemented by using any of software, hardware, and a combination of software and hardware. Programs constituting the software are previously stored in, for example, a recording medium (or a non-transitory recording medium) provided in the inside or the outside of the respective apparatuses. And the respective programs are, for example, read into a random access memory (RAM) during execution and executed by the processor such as the CPU.

The processing described with reference to the flowcharts in this specification does not necessarily need to be executed in order shown in the flowcharts. Some processing steps may be executed in parallel. Additional processing step may be employed and some processing steps may be omitted.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A communication control apparatus including:

a radio communication unit configured to provide second radio communication service within a cell in which a first base station provides first radio communication service; and a control unit configured to, when an operation mode of the radio communication unit is made to transition from a first mode to a second mode in which power is less consumed than in the first mode, switch the operation mode to the second mode after stepwise reducing transmission power of a reference signal to be transmitted from the radio communication unit.

(2)

The communication control apparatus according to (1), wherein, when the operation mode is made to transition from the first mode to the second mode, the control unit stands by for a period required for a terminal apparatus connected to the second radio communication service to switch a connection destination every time the transmission power is reduced by one step.

(3)

The communication control apparatus according to (2), wherein the control unit switches the operation mode to the second mode after the number of terminal apparatuses utilizing the second radio communication service becomes zero.

(4)

The communication control apparatus according to any one of (1) to (3), wherein, in a case where the radio communication unit operates in the first mode, when it is determined that load of the first radio communication service is low, the control unit switches the operation mode to the second mode.

(5)

The communication control apparatus according to (4), wherein the control unit switches the operation mode to the second mode according to an instruction from the first base station which determines that the load of the first radio communication service is low.

(6)

The communication control apparatus according to (4), wherein, when an index acquired from the first base station indicates that the load of the first radio communication service is low, the control unit switches the operation mode to the second mode.

(7)

The communication control apparatus according to (5) or (6), wherein the load of the first radio communication service is determined based on a traffic amount of the first radio communication service.

(8)

The communication control apparatus according to (5) or (6), wherein the load of the first radio communication service is determined based on the number of radio bearers or the number of terminals being connected in the first radio communication service.

(9)

The communication control apparatus according to (5) or (6), wherein the load of the first radio communication service is determined based on communication quality measured in the first radio communication service.

(10)

The communication control apparatus according to any one of (1) to (9), wherein, in the case where the radio communication control unit operates in the second mode, when it is determined that the load of the first radio communication service is high, the control unit switches the operation mode to the first mode.

(11)

The communication control apparatus according to (10), wherein a first threshold to be compared with the load of the first radio communication service for switching from the first mode to the second mode is lower than a second threshold to be compared with the load of the first radio communication service for switching from the second mode to the first mode.

(12)

The communication control apparatus according to any one of (1) to (11), wherein the first mode is a mode in which the radio communication unit continuously operates, and the second mode is a mode in which the radio communication unit intermittently operates.

(13)

The communication control apparatus according to (12), wherein, in the second mode, the control unit also intermittently operates.

(14)

The communication control apparatus according to any one of (1) to (13), wherein the first mode is a mode in which a plurality of component carriers are used for the second radio communication service, and the second mode is a mode in which component carriers fewer than the first mode are used for the second radio communication service.

(15)

The communication control apparatus according to (14), wherein, when the operation mode is made to transition from the first mode to the second mode, the control unit stepwise reduces the transmission power of the reference signal of a component carrier to be removed.

(16)

The communication control apparatus according to any one of (1) to (15), wherein, when it is determined that communication quality measured in the second radio communication service is able to be further reduced, the control unit reduces the transmission power of the reference signal.

(17)

A communication control method including:

providing second radio communication service by a second base station within a cell in which a first base station provides first radio communication service; and switching, when an operation mode of the second base station is made to transition from a first mode to a second mode in which power is less consumed than in the first mode, the operation mode to the second mode after stepwisely reducing transmission power of a reference signal to be transmitted from the second base station.

(18)
A radio communication system including:
a first base station configured to provide first radio communication service; and
a second base station including
a radio communication unit configured to provide second radio communication service within a cell of the first radio communication service, and
a control unit configured to, when an operation mode of the radio communication unit is made to transition from a first mode to a second mode in which power is less consumed than in the first mode, switch the operation mode to the second mode after stepwisely reducing transmission power of a reference signal to be transmitted from the radio communication unit.

(19)
A terminal apparatus including:
a radio communication unit configured to utilize second radio communication service provided by a second base station within a cell in which a first base station provides first radio communication service; and
a control unit configured to switch a connection destination of the radio communication unit from the second base station to another base station while transmission power of a reference signal received by the radio communication unit is reduced stepwisely in the process in which an operation mode of the second base station transitions from a first mode to a second mode in which power is less consumed than in the first mode.

(20)
A communication control apparatus including:
a radio communication unit configured to provide first radio communication service within a cell; and
a control unit configured to, when an operation mode of a second base station which provides second radio communication service within the cell is made to transition from a first mode to a second mode in which power is less consumed than in the first mode, made the second base station switch the operation mode to the second mode after stepwisely reducing transmission power of a reference signal to be transmitted from the second base station.

REFERENCE SIGNS LIST 1 radio communication system
10 first base station (macro cell base station)
110 radio communication unit
140, 160 control unit
20 second base station (small cell base station)
210 radio communication unit
240, 260 control unit
30 terminal apparatus

The invention claimed is:
1. A communication control apparatus, comprising:
a radio communication unit configured to provide a second radio communication service within a cell to a first plurality of terminals,
wherein a first base station provides a first radio communication service within the cell to a second plurality of terminals, and
wherein the communication control apparatus is in a first mode; and
a control unit configured to:
receive a control message from the first base station;
determine, based on the control message, a second mode as a target of transition from the first mode,
wherein a first power consumption in the first mode is different from a second power consumption in the second mode;
determine a transition method for the transition from the first mode;
reduce a transmission power of a first reference signal by at least one step to obtain a second reference signal, based on the transition method;
detect a completion status that indicates transition of connection of each of the first plurality of terminals from the communication control apparatus to a respective one of a plurality of connection destinations in a total time period,
wherein the total time period is a sum total of time taken for the transition of connection of each of the first plurality of terminals, and
wherein the communication control apparatus is in standby mode in the total time period; and
switch, based on the completion status, from the first mode to the second mode.

2. The communication control apparatus according to claim 1, wherein the control unit is further configured to:
determine a count of terminal apparatuses of the first plurality of terminals, that utilize the second radio communication service; and
switch the first mode to the second mode, based on the count being zero.

3. The communication control apparatus according to claim 1, wherein the control unit is further configured to switch the first mode to the second mode, based on a first communication load of the first radio communication service being lower than a first threshold value.

4. The communication control apparatus according to claim 3, wherein the control unit is further configured to:
switch the first mode to the second mode, based on an instruction from the first base station, wherein the first base station determines that the first communication load of the first radio communication service is lower than the first threshold value.

5. The communication control apparatus according to claim 4, wherein the first base station determines the first communication load, based on a traffic amount of the first radio communication service.

6. The communication control apparatus according to claim 4, wherein the first base station determines the first communication load of the first radio communication service based on a first count of one of radio bearers or terminal apparatuses of the first plurality of terminals, in connection with the first radio communication service for a first time period.

7. The communication control apparatus according to claim 4, wherein the first base station determines the first communication load of the first radio communication service based on a communication quality indicator of the first radio communication service.

8. The communication control apparatus according to claim 3, wherein the control unit is further configured to:
acquire from the first base station, an index that indicates that the first communication load of the first radio communication service is lower than the first threshold value; and switch the first mode to the second mode, based on the acquired index.

9. The communication control apparatus according to claim 1, wherein the control unit is further configured to switch from the second mode to the first mode, based on a second communication load of the first radio communication service being higher than a second threshold value.

10. The communication control apparatus according to claim 9, wherein the control unit is further configured to:
switch from the first mode to the second mode, based on a first communication load being lower than a first threshold value,
wherein the first threshold value is lower than the second threshold value.

11. The communication control apparatus according to claim 1,
wherein in the first mode, the radio communication unit is further configured to operate continuously, and
wherein in the second mode, the radio communication unit is further configured to operate intermittently.

12. The communication control apparatus according to claim 11, wherein, in the second mode, the control unit is further configured to operate intermittently.

13. The communication control apparatus according to claim 1,
wherein the first mode corresponds to utilization of a plurality of first component carriers for the second radio communication service,
wherein the second mode corresponds to utilization of a plurality of second component carriers for the second radio communication service, and
wherein a first count of the plurality of second component carriers is smaller than a second count of the plurality of first component carriers.

14. The communication control apparatus according to claim 13, wherein, based on the target of transition and the transition method, the control unit is further configured to reduce the transmission power of the first reference signal of a component carrier of the plurality of second component carriers.

15. The communication control apparatus according to claim 1, wherein based on a determination that an amount of reduction of a communication quality indicator of the second radio communication service is greater than a threshold amount, the control unit is further configured to reduce the transmission power of the first reference signal.

16. A communication control method, comprising:
in a communication control apparatus:
providing a second radio communication service by a second base station within a cell to a first plurality of terminals,
wherein a first base station provides a first radio communication service in the cell to a second plurality of terminals, and
wherein the communication control apparatus is in a first mode;
receiving a control message from the first base station;
determining, based on the control message, a second mode as a target of transition from the first mode,
wherein a first power consumption in the first mode is different from a second power consumption in the second mode;
determining a transition method for the transition from the first mode;
reducing a transmission power of a first reference signal by at least one step to obtain a second reference signal, based on the transition method;
detecting a completion status that indicates transition of connection of each of the first plurality of terminals from the communication control apparatus to a respective one of a plurality of connection destinations in a total time period,
wherein the total time period is a sum total of time taken for the transition of connection of each of the first plurality of terminals, and
wherein the communication control apparatus is in standby mode in the total time period; and
switching, based on the completion status, from the first mode to the second mode.

17. A radio communication system, comprising:
a first base station configured to provide a first radio communication service within a cell to a first plurality of terminals; and
a second base station including:
a radio communication unit configured to provide a second radio communication service within the cell to a second plurality of terminals,
wherein the second base station is in a first mode; and
a control unit configured to:
receive a control message from the first base station;
determine, based on the control message, a second mode as a target of transition from the first mode,
wherein a first power consumption in the first mode is different from a second power consumption in the second mode;
determine a transition method for the transition from the first mode;
reduce a transmission power of a first reference signal by at least one step to obtain a second reference signal, based on the transition method;
detect a completion status that indicates transition of connection of each of the second plurality of terminals from the second base station to a respective one of a plurality of connection destinations in a total time period,
wherein the total time period is a sum total of time taken for the transition of connection of each of the second plurality of terminals, and
wherein the second base station is in standby mode in the total time period; and
switch, based on the completion status, from the first mode to the second mode.

18. A communication control apparatus, comprising:
a radio communication unit configured to:
provide a first radio communication service within a cell to a first plurality of terminals; and
communicate with a second base station that provides a second radio communication service within the cell to a second plurality of terminals; and
a control unit configured to:
transmit a control message to the second base station;
control the second base station, that is in a first mode, to:
determine, based on the control message, a second mode as a target of transition from the first mode,
wherein a first power consumption in the first mode of the second base station is different from a second power consumption in the second mode;
determine a transition method for the transition from the first mode;
reduce a transmission power of a first reference signal by at least one step to obtain a second reference signal, based on the transition method;

detect a completion status that indicates transition of connection of each of the second plurality of terminals from the second base station to a respective one of a plurality of connection destinations in a total time period,
    wherein the total time period is a sum total of time taken for the transition of connection of each of the second plurality of terminals, and
    wherein the second base station is in a standby mode in the total time period; and
switch the first mode to the second mode, based on the completion status.

\* \* \* \* \*